(12) United States Patent
Puri et al.

(10) Patent No.: US 7,630,444 B1
(45) Date of Patent: *Dec. 8, 2009

(54) SYSTEM AND METHOD OF FILTERING NOISE

(75) Inventors: Atul Puri, Riverdale, NY (US); Mehmet Reha Civanlar, Middletown, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 1065 days.

This patent is subject to a terminal disclaimer.

(21) Appl. No.: 10/954,884

(22) Filed: Sep. 30, 2004

Related U.S. Application Data

(63) Continuation of application No. 09/874,877, filed on Jun. 5, 2001, now Pat. No. 6,810,086.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.29
(58) Field of Classification Search ............ 375/240.29
See application file for complete search history.

(56) References Cited

U.S. PATENT DOCUMENTS

| | | | |
|---|---|---|---|
| 5,513,282 A | 4/1996 | Williams | |
| 5,748,789 A | 5/1998 | Lee et al. | |
| 6,094,457 A | 7/2000 | Linzer et al. | |
| 6,161,137 A | 12/2000 | Ogdon et al. | |
| 6,175,596 B1 | 1/2001 | Kobayashi et al. | |
| 6,182,069 B1 | 1/2001 | Niblack et al. | |
| 6,266,442 B1 | 7/2001 | Laumeyer et al. | |
| 6,285,797 B1 | 9/2001 | Lubin et al. | |
| 6,539,060 B1 | 3/2003 | Lee et al. | |
| 6,549,658 B1 | 4/2003 | Schweid et al. | |
| 6,631,162 B1 | 10/2003 | Lee et al. | |
| 7,643,387 | 11/2003 | Sethurman et al. | |
| 6,665,346 B1 | 12/2003 | Lee et al. | |
| 6,748,113 B1 | 6/2004 | Kondo et al. | |
| 6,909,745 B1 | 6/2005 | Puri et al. | |

*Primary Examiner*—Nhon T Diep

(57) ABSTRACT

A system and method of removing noise in a bitstream is disclosed. The system and method are most applicable to removing noise in a bitstream wherein the bitstream is encoded after being segmented into portions based on predefined classifications or models. Based on the segment classifications, each segment or portion is encoded with a different encoder associated with the portion model and chosen from a plurality of encoders. The coded bit-stream for each segment includes information regarding which encoder was used to encode that segment. A circuit for removing noise in video content comprises a first filter connected to a first input switch and a first output switch, the first filter being in parallel with a first pass-through line, a second filter connected to a second input switch and a second output switch, the second filter connected in parallel with a second pass-through line, and a third filter connected to a third input switch in a third output switch. The third filter is connected in parallel with a third pass-through line, wherein the first output switch is connected to the second input switch and the second output switch is connected to the third input switch. The first input switch, first output switch, second input switch, second output switch, third input switch, and third output switch are controlled to either filter each video portion or not filter each video portion according to descriptors related to the video content.

17 Claims, 15 Drawing Sheets

100

200

300

400

406

SYSTEM AND METHOD OF FILTERING NOISE

PRIORITY CLAIM

The present application claims priority to U.S. patent application Ser. No. 09/874,877, filed on Jun. 5, 2001, the contents of which are incorporated herein by reference.

RELATED APPLICATIONS

The present disclosure is related to: Ser. No. 09/874,873, entitled "Content Adaptive Video Encoding" filed concurrently herewith and which is incorporated herein by reference; Ser. No. 09/874,872, entitled "A Method of Content Adaptive Video Encoding" filed concurrently herewith and which is incorporated herein by reference; Ser. No. 09/874,879, entitled "A System for Content Adaptive Video Decoding", filed concurrently herewith and which is incorporated herein by reference; and Ser. No. 09/874,878, entitled "A Method of Content Adaptive Video Decoding", filed concurrently herewith and which is incorporated herein by reference.

FIELD OF THE INVENTION

The invention relates to filtering video signals, and more particularly, to a system and method of filtering a bitstream created according to a content adaptive encoding method.

BACKGROUND OF THE INVENTION

Video compression has been a popular subject for academia, industry and international standards bodies alike for more than two decades. Consequently, many compressors/decompressors, or coders/decoders ("codecs") have been developed providing performance improvements or new functionality over the existing ones. Several video compression standards include MPEG-2, MPEG-4, which has a much wider scope, and H.26L and H.263 that mainly target communications applications.

Some generic codecs supplied by companies such as Microsoft® and Real Networks® enable the coding of generic video/movie content. Currently, the MPEG-4 standard and the H.26L, H.263 standards offer the latest technology in standards-based codecs, while another codec DivX;-) is emerging as an open-source, ad-hoc variation of the MPEG-4 standard. There are a number of video codecs that do not use these or earlier standards and claim significant improvements in performance; however, many such claims are difficult to validate. General purpose codecs do not provide significant improvement in performance. To obtain significant improvements, video codecs need to be highly adapted to the content they expect to code.

The main application of video codecs may be classified in two broad categories based on their interactivity. The first category is interactive bi-directional video. Peer-to-peer communications applications usually involve interactive bi-directional video such as video telephony. In video telephony, the need exists for low delay to insure that a meaningful interaction can be achieved between the two parties and the audio and video (speaker lip movements) are not out of synchronization. Such a bi-directional video communication system requires each terminal both to encode and decode video. Further, low delay real-time encoding and decoding and cost and size issues require similar complexity in the encoders and decoders (the encoder may still be 2-4 times more complex than the decoder), resulting in almost a symmetrical arrangement.

The second category of video codecs relates to video distribution applications, including broadcast and Video-on-Demand (VoD). This second category usually does not involve bi-directional video and, hence, allows the use of high complexity encoders and can tolerate larger delays. The largest application of the second group is entertainment and, in particular, distribution of full-length movies. Compressing movies for transmission over the common broadband access pipes such as cable TV or DSL has obvious and significant applications. An important factor in delivering movies in a commercially plausible way includes maintaining quality at an acceptable level at which viewers are willing to pay.

The challenge is to obtain a very high compression in coding of movies while maintaining an acceptable quality. The video content in movies typically covers a wide range of characteristics: slow scenes, action-packed scenes, low or high detailed scenes, scenes with bright lights or shot at night, scenes with simple camera movements to scenes with complex movements, and special effects. Many of the existing video compression techniques may be adequate for certain types of scenes but inadequate for other scenes. Typically, codecs designed for videotelephony are not as efficient for coding other types of scenes. For example, the International Telecommunications Union (ITU) H.263 standard codec performs well for scenes having little detail and slow action because in video telephony, scenes are usually less complex and motion is usually simple and slow. The H.263 standard optimally applies to videoconferencing and videotelephony for applications ranging from desktop conferencing to video surveillance and computer-based training and education. The H.263 standard aims at video coding for lower bit rates in the range of 20-30 kbps.

Other video coding standards are aimed at higher bitrates or other functionalities, such as MPEG-1 (CDROM video), MPEG-2 (digital TV, DVD and HDTV), MPEG-4 (wireless video, interactive object based video), or still images such as JPEG. As can be appreciated, the various video coding standards, while being efficient for the particular characteristics of a certain type of content such as still pictures or low bit rate transmissions, are not optimal for a broad range of content characteristics. Thus, at present, none of the video compression techniques adequately provides acceptable performance over the wide range of video content.

FIG. 1 illustrates a prior art frame-based video codec and FIG. 2 illustrates a prior art object based video codec. As shown in FIG. 1, a general purpose codec 100 is useful for coding and decoding video content such as movies. Video information may be input to a spatial or temporal downsampling processor 102 to undergo fixed spatial/temporal downsampling first. An encoder 104 encodes video frames (or fields) from the downsampled signal. An example of such an encoder is an MPEG-1 or MPEG-2 video encoder. Encoder 104 generates a compressed bitstream that can be stored or transmitted via a channel. The bitstream is eventually decoded via corresponding decoder 106 that outputs reconstructed frames to a postprocessor 108 that may spatially and/or temporally upsample the frames for display.

FIG. 2 shows a block diagram of a specialized object-based codec 200 for coding and decoding video objects as is known in the art. Video content is input to a scene segmenter 202 that segments the content into video objects. A segment is a temporal fragment of the video. The segmenter 202 also produces a scene description 204 for use by the compositor 240 in reconstructing the scene. Not shown in FIG. 2 is the encoder of the scene description produced by segmenter 202.

The video objects are output from lines 206 to a preprocessor 208 that may spatially and/or temporally downsample the objects to output lines 210. The downsampled signal may be input to an encoder 212 such as a video object encoder using the MPEG-2, MPEG-4 or other standard known to those of skill in the art. The contents of the MPEG-2, MPEG-4, H.26L and H.263 standards are incorporated herein by reference. The encoder 212 encodes each of these video objects separately and generates bitstreams 214 that are multiplexed by a multiplexer 216 that can either be stored or transmitted on a channel 218. The encoder 212 also encodes header information. An external encoder (not shown) encodes scene description information 204 produced by segmenter 202.

The video objects bitstream is eventually demultiplexed using a demultiplexer 220 into individual video object bitstreams 224 and are decoded in video object decoder 226. The resulting decoded video objects 228 may undergo spatial and/or temporal upsampling using a postprocessor 230 and the resulting signals on lines 232 are composed to form a scene at compositor 240 that uses a scene description 204 generated at the encoder 202, coded by external means and decoded and input to the compositor 240.

Some codecs are adaptive in terms of varying the coding scheme according to certain circumstances, but these codecs generally change "modes" rather than address the difficulties explained above. For example, some codecs will switch to a different coding mode if a buffer is full of data. The new mode may involve changing the quantizer to prevent the buffer from again becoming saturated. Further, some codecs may switch modes based on a data block size to more easily accommodate varying sized data blocks. In sum, although current codecs may exhibit some adaptiveness or mode selection, they still fail to address the inefficiencies in encoding and decoding a wide variety of video content using codecs developed for narrow applications.

SUMMARY

What is needed in the art is a codec that adaptively changes its coding techniques based on the content of the particular video scene or portion of a scene. The present invention relates to a content-adaptive coding and decoding system and method in which the video codec adapts to the characteristics and attributes of the video content. As part of the codec disclosed in the present disclosure, the present invention relates to a system and method of filtering noise introduced into the bitstream when the codecs disclosed herein are used to code and decode the bitstream.

According to a first embodiment of the invention, the invention comprises a circuit for removing noise in video content where the video content is divided into video portions. The circuit comprises a first filter connected to a first input switch and a first output switch, the first filter being in parallel with a first pass-through line. A second filter is connected to a second input switch and a second output switch, the second filter being connected in parallel with a second pass-through line. A third filter is connected to a third input switch in a third output switch, the third filter being connected in parallel with a third pass-through line. The first output switch is connected to the second input switch and the second output switch is connected to the third input switch, wherein the first input switch, first output switch, second input switch, second output switch, third input switch, and third output switch are controlled to either filter each video portion or not filter each video portion according to descriptors related to the video content.

The filters of the present invention may be of many varieties. For example, the first filter may be a blockiness removal filter, the second filter may be a ringing removal filter, and the third filter may be a noise smoothing filter or a noise rejection filter.

The second embodiment of the invention relates to a method of removing noise from video content divided into video portions, each video portion being decoded by either a generic decoder or a decoder chosen from a plurality of the decoders, each decoder of the plurality of the decoders associated with a content model. The method uses a first filter having a first bypass line and a second filter having a second bypass line.

The method comprises receiving descriptors associated with the each video portion, filtering using or bypassing the first filter according to the received descriptors for each video portion, filtering using or bypassing the second filter according to the received descriptors for each video portion. Additional features of the method include filtering using or bypassing the first filter according to the decoder used to decode each video portion and filtering using or bypassing the second filter according to the decoder used to decode each video portion.

BRIEF DESCRIPTION

The present invention may be understood with reference to the attached drawings, of which:

DETAILED DESCRIPTION

Figure 3:
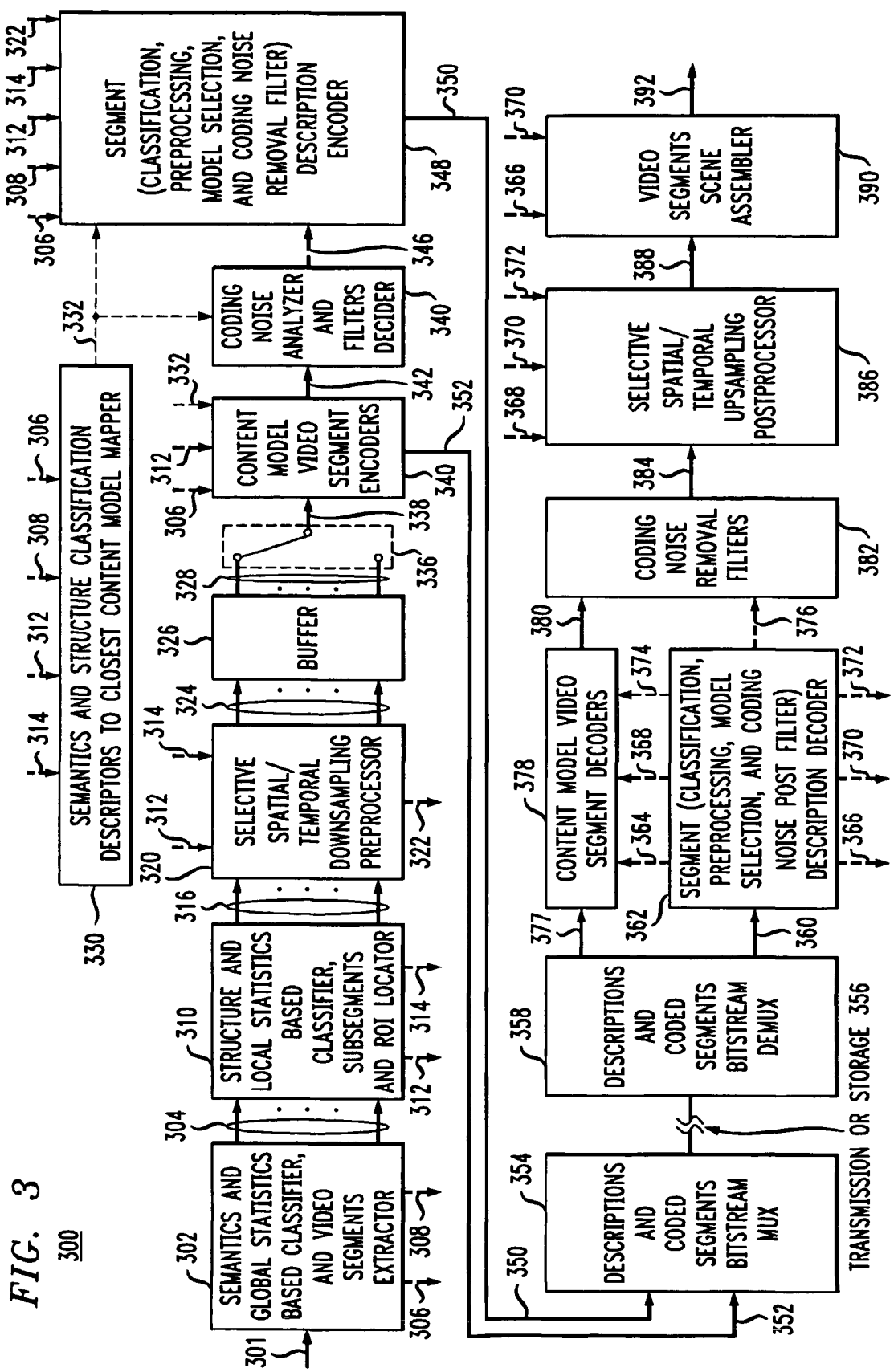
FIG. 3 shows an exemplary content adaptive segment-based video codec.

The present invention may be understood with reference to FIGS. 3-16b that illustrate embodiments and aspects of the invention. As is known, the system includes a tangible computer-readable storage medium storing instructions for controlling the computing device or system to perform the steps disclosed herein. FIG. 3 illustrates a system for providing video content encoding and decoding according to a first embodiment of the invention. A block diagram of the system 300 illustrates a specialized codec for coding and decoding video portions (segments, subsegments or ROIs). The video portions may be part of a movie or any kind of video or multi-media content. The video content is input via line 301 to an extractor 302 for semantic and global statistics analysis based on predefined classifications. The extractor 302 also performs video segments extraction. The outcome of the classification and extraction process is a video stream divided into a number of portions on outputs 304, as well as specific descriptors output on line 306 defining high level semantics of each portion as well as identifiers and time code output on line 308 for each portion.

The terms "portion" or "fragment" are used herein may most commonly refer to a video "segment" but as made clear above, these terms may refer to any of a segment, subsegment, region of interest, or other data. Similarly, when the other terms are used herein, they may not be limited to the exact definition of the term. For example, the term "segment" when used herein may primarily refer to a segment but it may also refer to a region of interest or a subsegment or some other data.

Turning momentarily to a related industry standard, MPEG-7, called the "Multimedia Content Description Interface", relates to multimedia content and supports a certain degree of interpretation of the information's meaning. The MPEG-7 standard is tangentially related to the present disclosure and its contents in its final form are incorporated herein by reference. The standard produces descriptors associated with multimedia content. A descriptor in MPEG-7 is a representation of a feature of the content, such as grid layouts of images, histograms of a specific visual item, color or shape, object motion or camera motion. The MPEG-7 standard, however, is primarily focused on providing a quick and efficient searching mechanism for locating information about various types of multimedia material. Therefore, the MPEG-7 standard fails to address video content encoding and decoding.

The MPEG-7 standard is useful, for example, to describe and index audio/video content to enable such uses as a song location system. In this example, if a person wishes to locate a song but does not know the title, the person may hum or sing a portion of the song to a speech recognition system. The received data is used to perform a search of a database of the indexed audio content to locate the song for the person. The concept of indexing audio/video content is related to the present disclosure and some of the parameters and methods of indexing content according to MPEG-7 may be applicable to the preparation of descriptors and identifiers of audio/video content for the present invention.

Returning to the description of present invention, the descriptors, identifiers and time code output on lines 306 and 308 of FIG. 3 are shown as single signals, but are vectors and carry information for all portions in the video content. The descriptors may be similar to some of the descriptors used in MPEG-7. However, the descriptors contemplated according to the present invention are beyond the categorizations set forth in MPEG-7. For example, descriptors related to such video features as rotation, zoom compensation, and global motion estimation are necessary for the present invention but may not be part of MPEG-7.

Portions output on lines 304 are input to a locator or location module 310 that classifies the portion based on structure and local statistics. The locator 310 also locates subsegments and regions of interest (ROI). When a classification of motion, color, brightness or other feature is local within a subsegment, then the locator 310 may perform the classifications. When classifications are globally uniform, then the extractor 302 may classify them. The process of locating a region of interest means noting coordinates of a top left corner (or other corner) and a size, typically in an x and y dimension, of an area of interest. Locating an area of interest may also include noting a timecode of the frame or frames in which an ROI occurs. An example of a ROI includes an athlete such as a tennis player who moves around a scene, playing in a tennis match. The moving player may be classified as a region of interest since the player is the focus of attention in the game.

Figure 1:
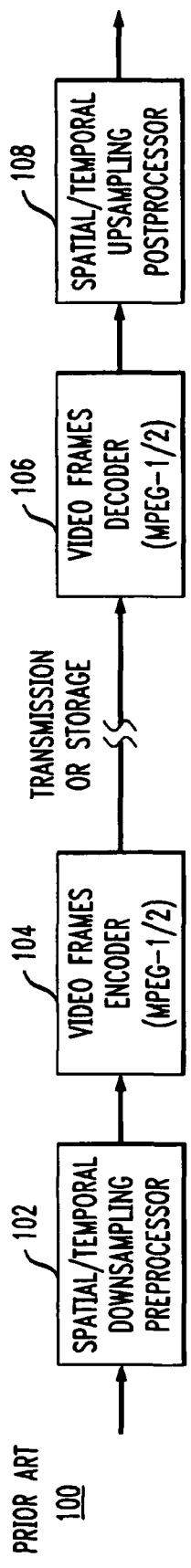
FIG. 1 illustrates a prior art frame-based video codec.
Figure 2:
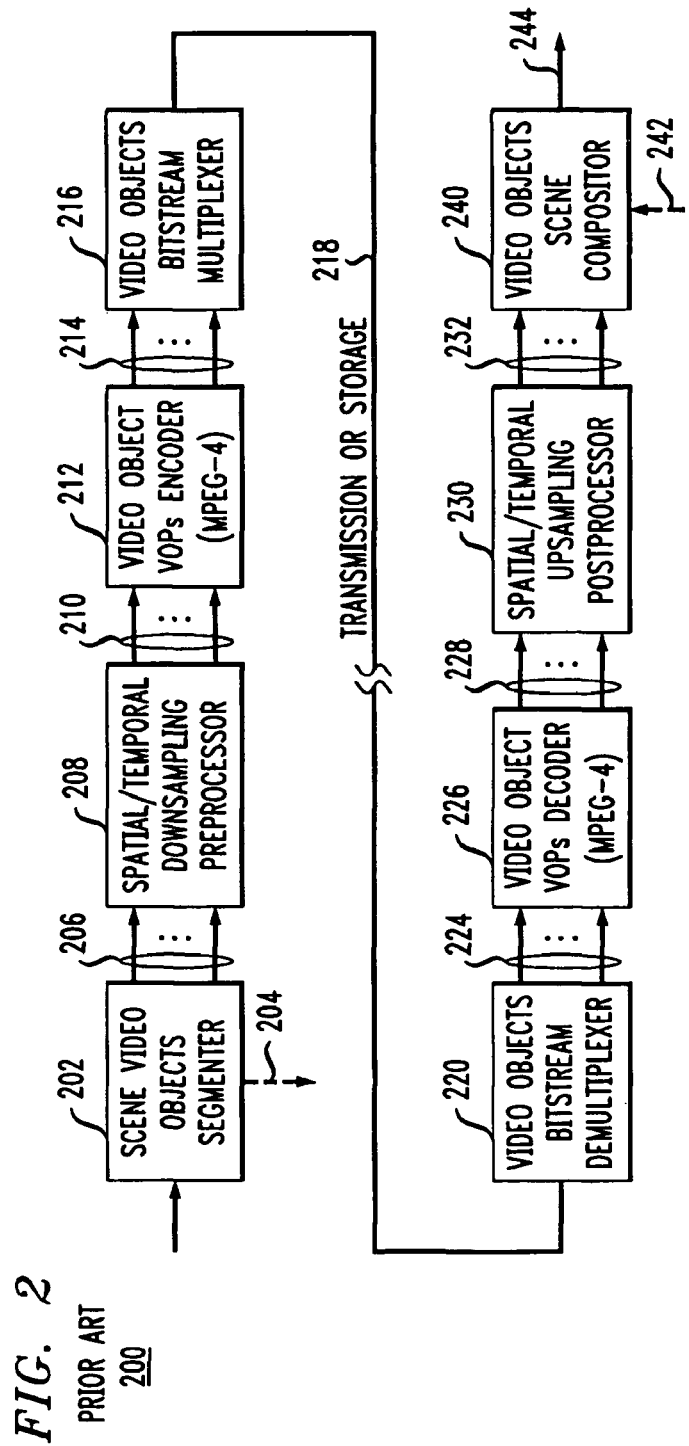
FIG. 2 illustrates a prior art object-based video codec.

The locator 310 further classifies each segment into subsegments as well as regions of interest and outputs the subsegments on lines 316. The locator 310 also outputs descriptors 312 defining the structure of each subsegment and ROI, and outputs timecode and ROI identifiers 314. Further descriptors for an ROI may include a mean or variance in brightness or, for example, if the region is a flat region or contains edges, descriptors corresponding to the region's characteristics. The subsegments 316 output from the locator 310 may be spatially/temporally down-sampled by a preprocessor 320. However, depending on the locator signals 312 and 314, an exception may be made to retain full quality for certain subsegments or ROIs. The operation of the downsampling processor similar to that of similar processors used in FIG. 1 and FIG. 2.

The preprocessor 320 outputs on lines 324 down-sampled segments that are temporarily stored in a buffer 326 to await encoding. Buffer outputs 328 make the segments available for further processing. The signal 322 optionally carries information regarding what filters were used prior to downsampling to reduce aliasing, such that an appropriate set of filters can be employed for upsampling at the decoding end. A content model mapper 330 receives the inputs 306 and 308 from the extractor 302 and inputs 312 and 314 from the locator 310 to provide a mapping of descriptors of each segment and subsegment to be encoded to the closest encoder model.

A plurality of encoders is illustrated as part of a content model video segment encoder 340. These encoders (shown in more detail in FIG. 9) are organized by model so that a particular encoder is associated with a model or characteristic of predetermined scene types. For example, one encoder may encode data most efficiently for high-speed action segments while another encoder may encode data most efficiently for slow scenes. At least one encoder is reserved as a generic encoder for scenes, segments or portions that do not adequately map to a particular model. The content model video segment encoders 340 receive descriptor information from line 306, subsegment and ROI information from line 312 and the output signal 332 from the mapper 330 indicating the model associated with a given portion. A switch 336 controls the outputs 328 of the buffer 326 such that the buffered portions are input on line 338 to the plurality of encoders 340 for encoding.

The characterization descriptors are preferably sent via the segment header. A segment description encoder 348 performs encoding of the header information that will include, among other types of data, data regarding which encoder of the encoder set 340 will encode the video data.

The mapper 330 receives signals 306, 308, 312, and 314 and outputs a signal 332 that reflects a model associated with a given portion. The mapper 330 analyzes the semantics and structural classification descriptors at its input and associates or maps those descriptors to one of the predefined models. The segment description encoder 348 encodes the signals 332 along with a number of other previously generated descriptors and signals 306, 308, 312, 314, 322 and 346 so that they are to be available for decoding without the need for recomputing the signals at the decoders. Signal 322 carries descriptors related to the spatial or temporal downsampling factors employed. Recomputing the signals would be computationally expensive and in some cases impossible since some of these signals are computed based on the original video segment data only available at the encoder.

Figure 11:
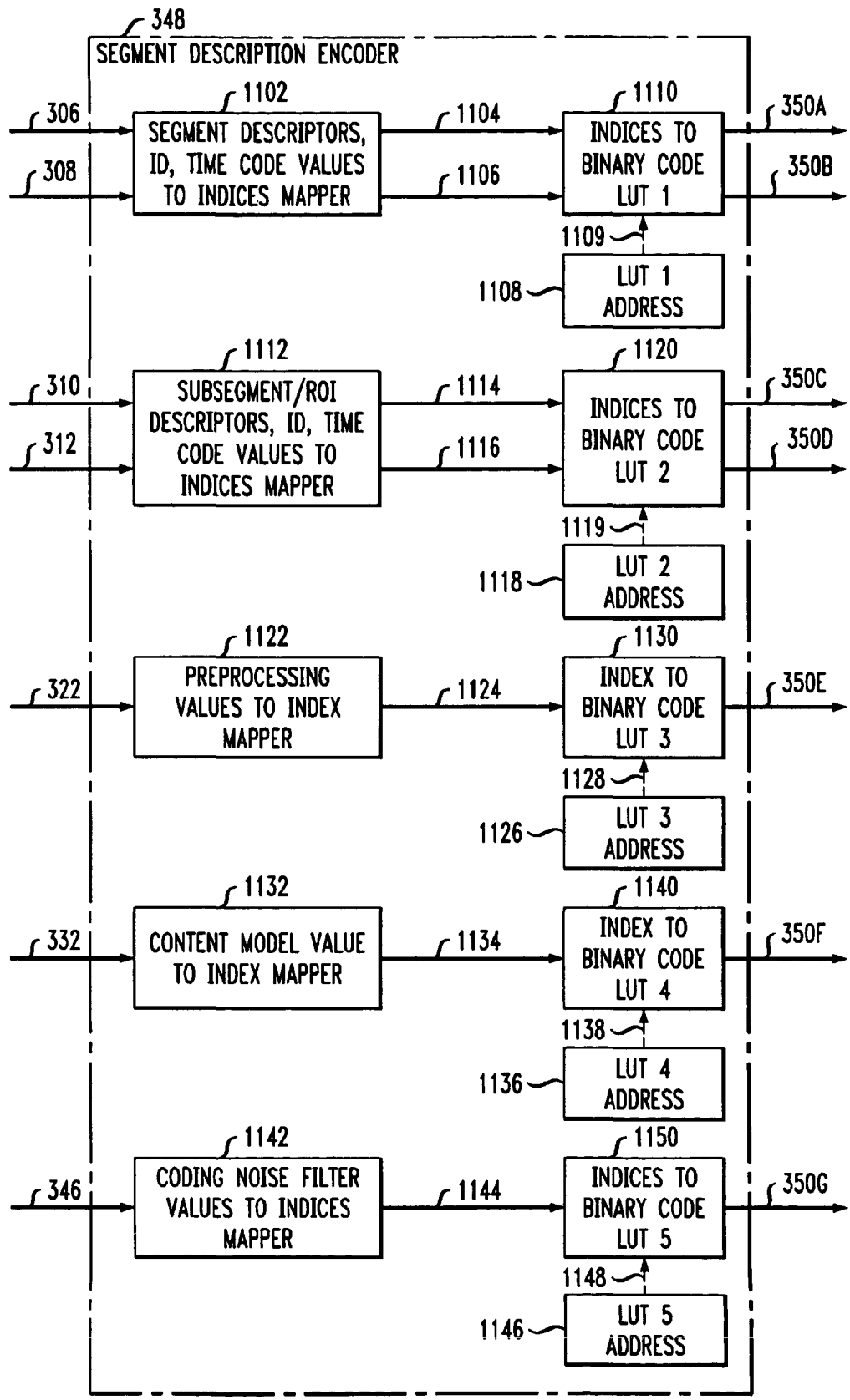
FIG. 11 is a block diagram illustrating a segment description encoder.

FIG. 11 illustrates the operation of the segment description encoder 348. The signal 346 provides data to the encoder 348 regarding the filters needed at the decoder for coding noise removal. Examples of coding noise include blockiness, ringing, and random noise. For selecting the right filter or filters, the locally decoded video segments from the encoder 340 are input via connection 342 to coding noise analyzer and filters decider 344, which also receives the chosen model indication signal 332. The output of the coding noise analyzer and filters decider 344 is the aforementioned signal 346.

A coded bitstream of each video segment is available at the output 352 of the encoder 340. Coded header bits containing descriptors and other signals are available at the output 350 of the segment description encoder 348. The coded video segment bitstreams and header bits are buffered and multiplexed 354 for transmission or storage 356. While the previous description of the segmentation, classification, buffering, modeling, and filtering procedure is very specific, the present invention contemplates that obvious variations on the system structure may be employed to carry out the process of extracting segments, classifying the content of the segment, and matching or mapping the segment content to a model for the purpose of choosing an encoder from a plurality of encoders to efficiently encode the video content on a segment-by-segment basis. These variations include storing computer instructions in a tangible computer-readable storage medium that control the system to perform the steps disclosed herein.

Figure 12:
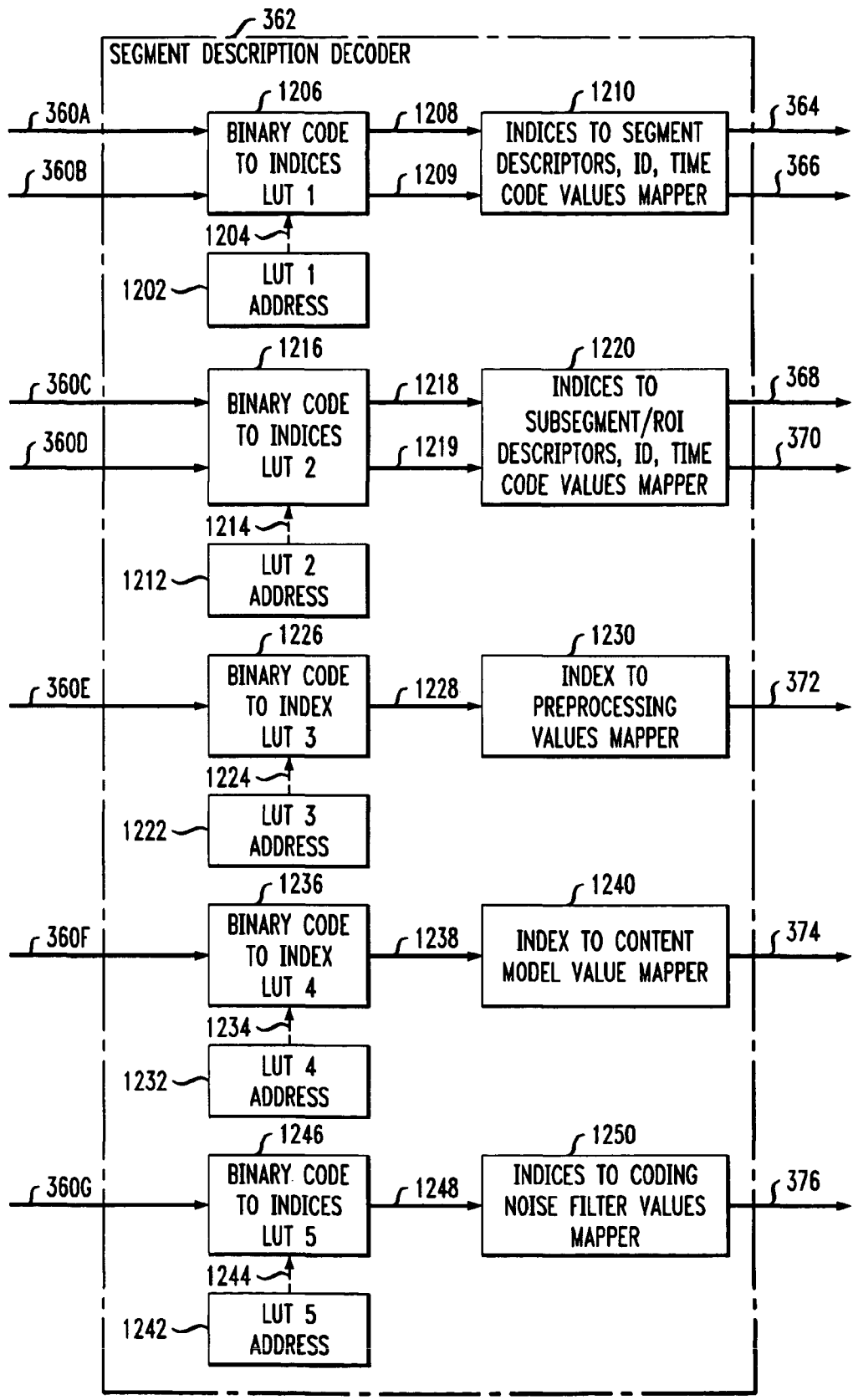
FIG. 12 is a block diagram illustrating a segment description decoder.

Prior to decoding, a descriptions and coded segment bitstream demultiplexer 358 demultiplexes video segment bitstreams and header bits and either outputs 377 a signal to a set of content model video segment decoders 378 or forwards 360 the signal to a segment description decoder 362. Decoder 362 decodes a plurality of descriptors and control signals (encoded by encoder 348) and outputs signals on lines 364, 366, 368, 370, 372, 374, and 376. FIG. 12 illustrates in further detail the decoder 362. The signals 364, 366, 368, 370, 372, 374, and 376 are decoder descriptors and signals that correspond respectively to encoder signals and descriptors 306, 308, 312, 314, 322, 332, and 346.

Figure 13:
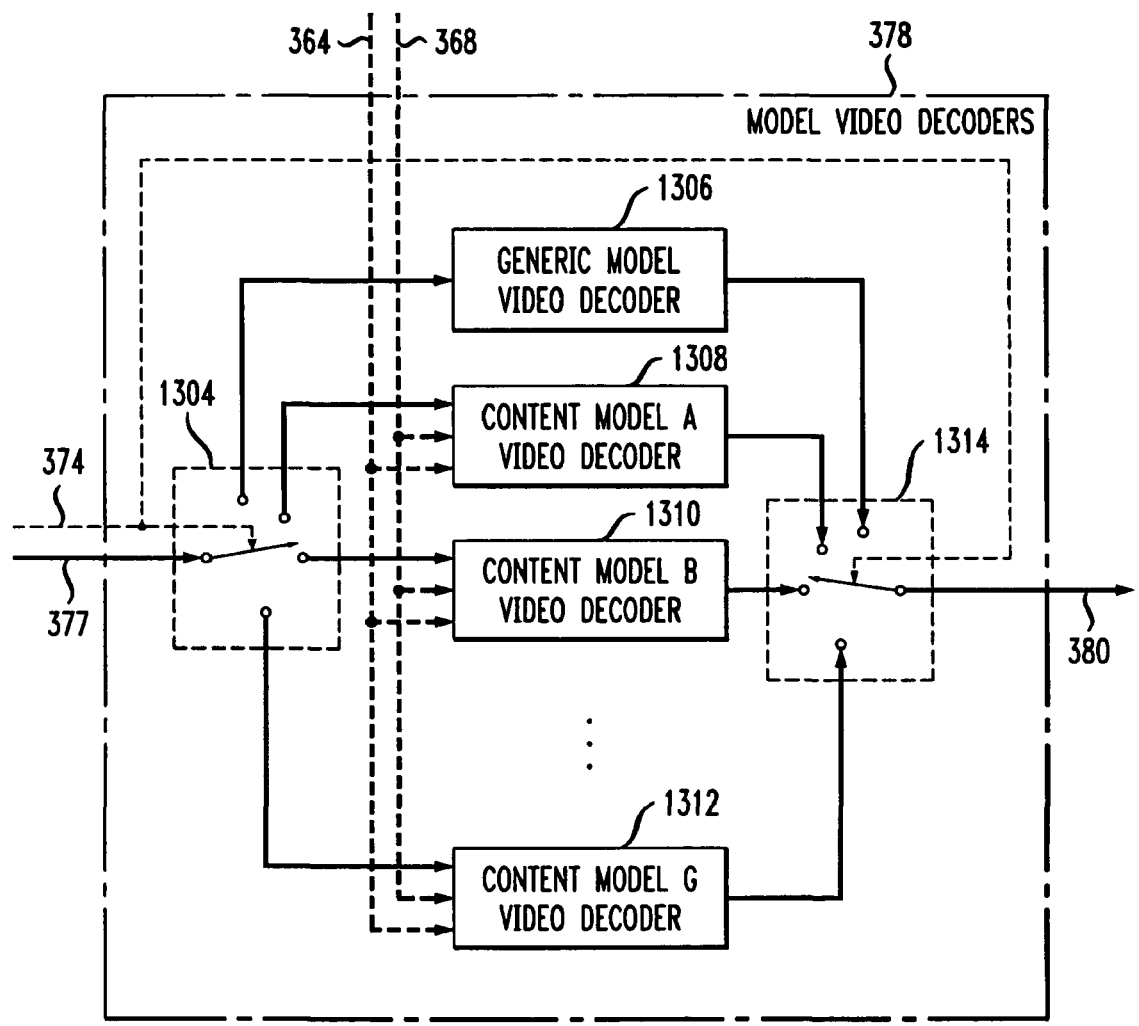
FIG. 13 is a block diagram illustrating an exemplary set of content model video segment decoders.

The coded video bitstream is segment-by-segment (portion-by-portion) decoded using a set of content model video segment decoders 378 including a plurality of decoders that each have associated models matching the models of the encoder set 340. FIG. 13 illustrates in more detail the decoders 378. The set of decoders 378 includes a generic model decoder for decoding segments that could not be adequately associated with a model by the mapper 330. Video segments decoded sequentially on line 380 are input to a set of coding noise removal filters 382 that uses signal 376 which identifies which filters for each type of noise (including no filter) are to be selected for processing the decoded segment.

Figure 14:
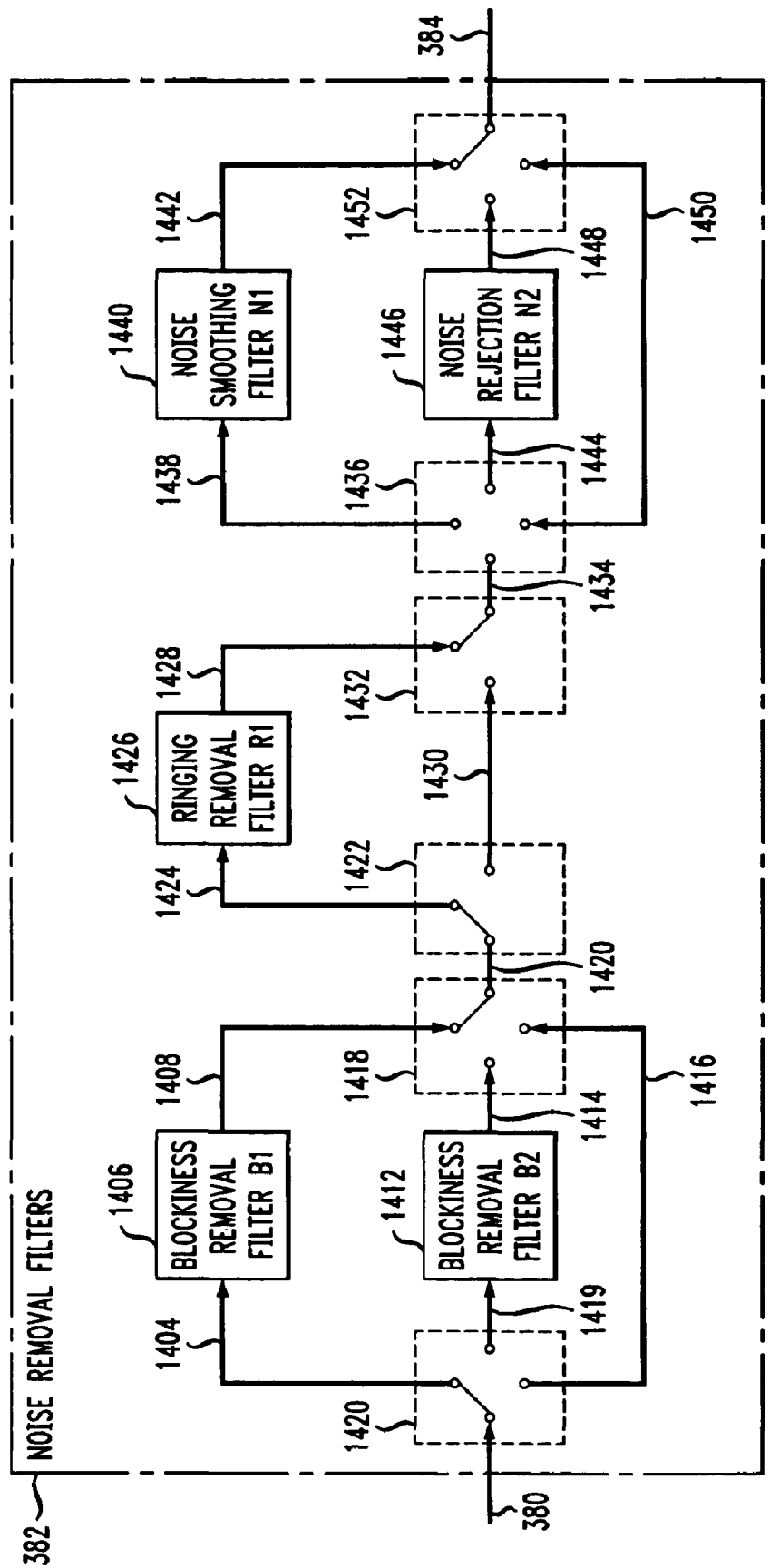
FIG. 14 is a block diagram illustrating a set of coding noise removal filters.

FIG. 14 provides further details regarding the operation of the coding noise removal filters 382. The coding noise removal filters 382 output 384 video segments cleaned of coding noise. The clean video segments undergo selective spatial/temporal upsampling in postprocesser 386. The postprocessor 386 receives structure descriptors 368, subsegment/ROI identifiers 370, and coded downsampling signals. The output 388 of upsampler postprocessor 386 is input to video segment scene assembler 390, which uses segment time code/ID descriptors 366 as well as subsegment timecode/ID descriptors 370 to buffer, assemble and output 392 decoded subsegments and segments in the right order for display.

Table 1 shows example features that can be used for classification of video scenes, segments, subsegments or regions of interest. Examples of the feature categories that may be used comprise source format, concepts used in a shot, properties of the shot, camera operations, and special effects. Other features may be chosen or developed that expand or change the features used to classify video content.

In the film industry the term 'shot' is used to describe camera capture of an individual scene or plot in a story, and is thus associated with continuous camera motion without a break in the action. Further, for practical reasons such as inserting special effects or transitions, a shot may often be subdivided into subshots. Rather than use the terms "shots" and "subshots" we prefer the more generalized terms "temporal segments" and "temporal subsegments." Further, in this disclosure, we consider the term temporal to be implicit and only utilize the terms "segments" and "subsegments." Thus, the process of generating segments is that of extracting from a larger sequence of frames, a subsequence of frames that matches a certain criteria or a concept. Further, within a number of consecutive frames of a segment (or a portion of a segment, subsegment), on a frame-by-frame basis, ROIs can be identified. This process may be much simpler than that of complete spatial segmentation of each frame into separate objects, known as segmentation to those of skill in the art.

For each category as shown in Table 1, one or more features may be used. For instance, a shot may be classified to a model based on a feature from a "source format" category, one or more features from a "concepts used in the shot" category and a "camera operations" category. Here, a feature is informally defined by its unique characteristics, and the values these characteristics are allowed to have. Formally, a feature is defined by a set of descriptors. Actual descriptors may be application dependent. For example, in a graphics oriented application, a color feature may be represented by several descriptors such as an RGB mean value descriptor, an RGB variance descriptor, and a RGB histogram descriptor.

In the source format feature category, the origination format of original video is identified as film, interlaced or a mixture of film and interlaced. The second column in Table 1 illustrates characteristics and example values for each of the features listed in the first column. For example, the frame rate and sequence type are just two of the characteristics that can be associated with each feature of the source format category. As an example, if the video portion or sequence originated from film, its type may be progressive and its frame rate 24. For this feature, the last column shows that, for example, identifying a sequence to have originated from film has implications for efficient coding it may need to be converted to 24 frames/s progressive (assuming, it was available as 30 frames/s interlaced) prior to coding. Likewise, a sequence originating from an interlaced camera should be coded using adaptive frame/field coding for higher coding efficiency.

Thus, examples of coding efficient tools are listed in the right column for a particular feature and its associated characteristics and values.

The next category shown in the table relates to concepts used in the shot. Example features for this category comprise title/text/graphics overlay, location and ambience, degree of action, degree of detail, scene cut, establishing shot, opposing glances shot, camera handling and motion, and shadows/silhouttes/camera flashes etc. Taking the feature "degree of action" as an example, this feature can be characterized by intensity, and further, the intensity can be specified as slow, medium or fast. For this feature, the last column shows that for efficient coding, motion compensation range should be sufficient, and the reference frames used for prediction should be carefully selected. Likewise, an opposing glances shot can be characterized by a length of such shot in number of frames, frequency with which this shot occurs, and number of players in the shot. For this feature, the last column shows that for efficient coding, reference frames for prediction should be carefully selected, intra coding should be minimized, and warped prediction as in sprites should be exploited.

The remaining feature categories such as properties of shot, camera operations, and special effects can be similarly explained since, like in previous categories, a number of features are listed for each category as well their characteristics and values they can acquire. For all such features, the last column lists a number of necessary tools for efficient coding. Table 1 is not meant to be limiting the invention only the features and characteristics listed. Other combinations and other features and characteristics may be utilized and refined to work within the arrangement disclosed herein.

TABLE 1

Content adaptive classification of video using features, and needed coding tools

| Feature | Characteristics and example values | Tools for efficient coding |
| --- | --- | --- |
| 1. Source Format | | |
| A. Film | frame rate: 24<br>type: progressive | Telecine inversion/insertion (if capture/display interlaced) |
| B. Interlaced | frame rate: 30<br>type: interlaced | Frame/field adaptive motion compensation and coding |
| C. Mixed (progressive film and interlace advertisements) | frame rate: 30<br>type: interlaced | Separation of frames to film or interlaced frames, frame/field coding and display |
| 2. Concepts used in the Shot | | |
| A. Title/Text/graphics overlay | anti-aliasing: yes/no<br>region of interest: yes/no | Spatial segmentation to identify region of interest, quantization |
| B. Location and Ambience | location: indoor/outdoor<br>time: morning/afternoon/night | Adaptive quantization |
| C. Degree of action | intensity: slow/medium/high | Range used for motion compensation, reference frames used for prediction |
| D. Degree of detail | amount: low/medium/high | Adaptive quantization, rate control |
| E. Scene cut | frequency: frequent/infrequent | Shot detection, spatial and temporal resolution changes to save bitrate |
| F. Establishing shot | length: number of frames<br>frequency: frequent/infrequent | Shot detection, key frame handling, Change of coder (motion/quantization) characteristics |
| G. Opposing glances shot | length: number of frames<br>frequency: frequent/infrequent<br>type: 2 person, 3 person, other number of people in shot | Selection of reference frames, minimize intra coding, warped prediction |
| H. Camera handling and motion | type: smooth/normal/jerky | Inter/intra mode selection, motion compensation, camera jitter compensation |
| I. Shadows/silhouttes and reflections, camera flashes, overall light changes | strength: low/mid/high<br>variation: high/normal/low | Local or global gain compensation |
| J. Derived or mixed with animation | blending: yes/no | Adaptive quantization, edge blending, grey level shape |
| 3. Properties of the Shot | | |
| A. Brightness Strength | strength: low/mid/high | Adaptive quantization |
| B. Brightness Distribution | distribution: even/clusters | Variable block size coding, localization for quantization |
| C. Texture Strength | strength: low/mid/high | Adaptive quantization |
| D. Texture Distribution | distribution: even/clusters | Variable block size coding, localization for quantization/rate control |

TABLE 1-continued

Content adaptive classification of video using features, and needed coding tools

| Feature | Characteristics and example values | Tools for efficient coding |
|---|---|---|
| E. Color Strength | strength: low/mid/high | Adaptive quantization |
| F. Color Distribution | distribution: even/clusters | Localization for quantization/rate control |
| G. Motion Strength | strength: slow/medium/fast | Motion estimation range |
| H. Motion Distribution | distribution: even/clusters/random/complex | Variable block size motion compensation, localization for motion estimation range |
| 4. Camera Operations | | |
| A. Fixed | — | Sprite, warping |
| B. Pan (horizontal rotation) | direction: horizontal/vertical | Pan compensation, motion compensation |
| C. Track (horizontal transverse movement, aka, travelling) | direction: left/right | Perspective compensation |
| D. Tilt (vertical rotation) | direction: up/down | Perspective compensation |
| E. Boom (vertical transverse movement) | direction: up/down | Perspective compensation |
| F. Zoom (change of focal length) | type: in/out | Zoom compensation |
| G. Dolly (translation along optical axis) | direction: forward/backward | Perspective compensation |
| H. Roll (translation around the optical axis) | direction: clockwise/counterclockwise | Perspective compensation |
| 5. Special Effects | | |
| A. Fade | type: in/out | Gain compensation |
| B. Cross Fade/Dissolve | strength: low/medium/high length: number of frames | Gain compensation, reference frame selection |
| C. Wipe | direction: up/down/left/right | Synthesis of wipe |
| D. Blinds | direction: left/right | Synthesis of blinds |
| E. Checkerboard | type: across/down | Synthesis of checkerboard |

Figure 4:
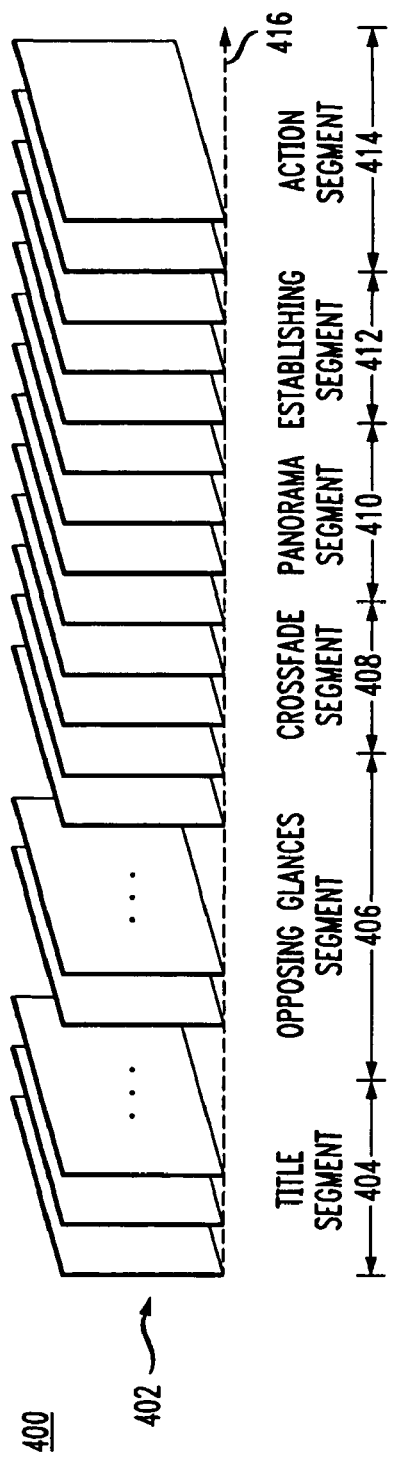
FIG. 4 is a diagram showing an example of video/movie sequence consisting of a number of types of video segments.

FIG. 4 shows in detail an example of classifying a movie scene 400 into a number of segments 402 including the title segment 404, an opposing glances segment 406, a crossfade segment 408, a panorama segment 410, an establishing shot segment 412, and an action segment 414. The title segment 404 contains the header of the movie and is composed of graphics (title, name of cast and crew of the movie) overlaid on background. The opposing glances segment 406 is a special concept typically used in a two person scene, where person A and B are shown alternately. The crossfade segment 408 provides a smooth transition between two scenes and the fade may last for a few seconds. The panorama segment 410 contains an outdoor slow panoramic shot where a next scene takes place. An establishing shot 412 follows, which is a brief external shot of the location where the next segment takes place. Finally, an action segment 414 may consist of a bar room fight sequence. The segments proceed in the order illustrated by direction 416.

The above description provides a general concept of the various kinds of segments that may be classified according to the invention. It is envisioned that variations on these descriptions and other kinds of segments may be defined. Each of these segments may be further broken up into sub-segments as is illustrated in FIG. 5.

Figure 5:
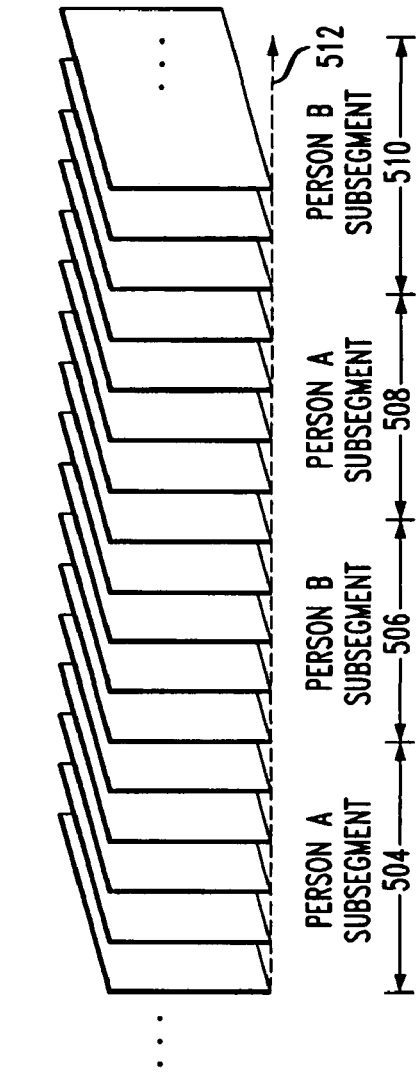
FIG. 5 is a diagram showing an example of an "opposing glances" video segment consisting of a number of subsegments.

FIG. 5 shows in detail an example of classification of an opposing glances segment 406 of FIG. 4 into a number of subsegments such as that alternating between a person A subsegment 504, a person B subsegment 506, a person A subsegment 508, and a person B subsegment 510. The scene proceeds in the direction illustrated by a direction arrow 512. Besides person A and B subsegments, an opposing glances segment may also contain a detailed close-up of an object under discussion by the persons A and B, as well as scenes containing both persons A and B. Thus, there are many variations on the structure of scenes in an "opposing glances" segment.

Figure 6:
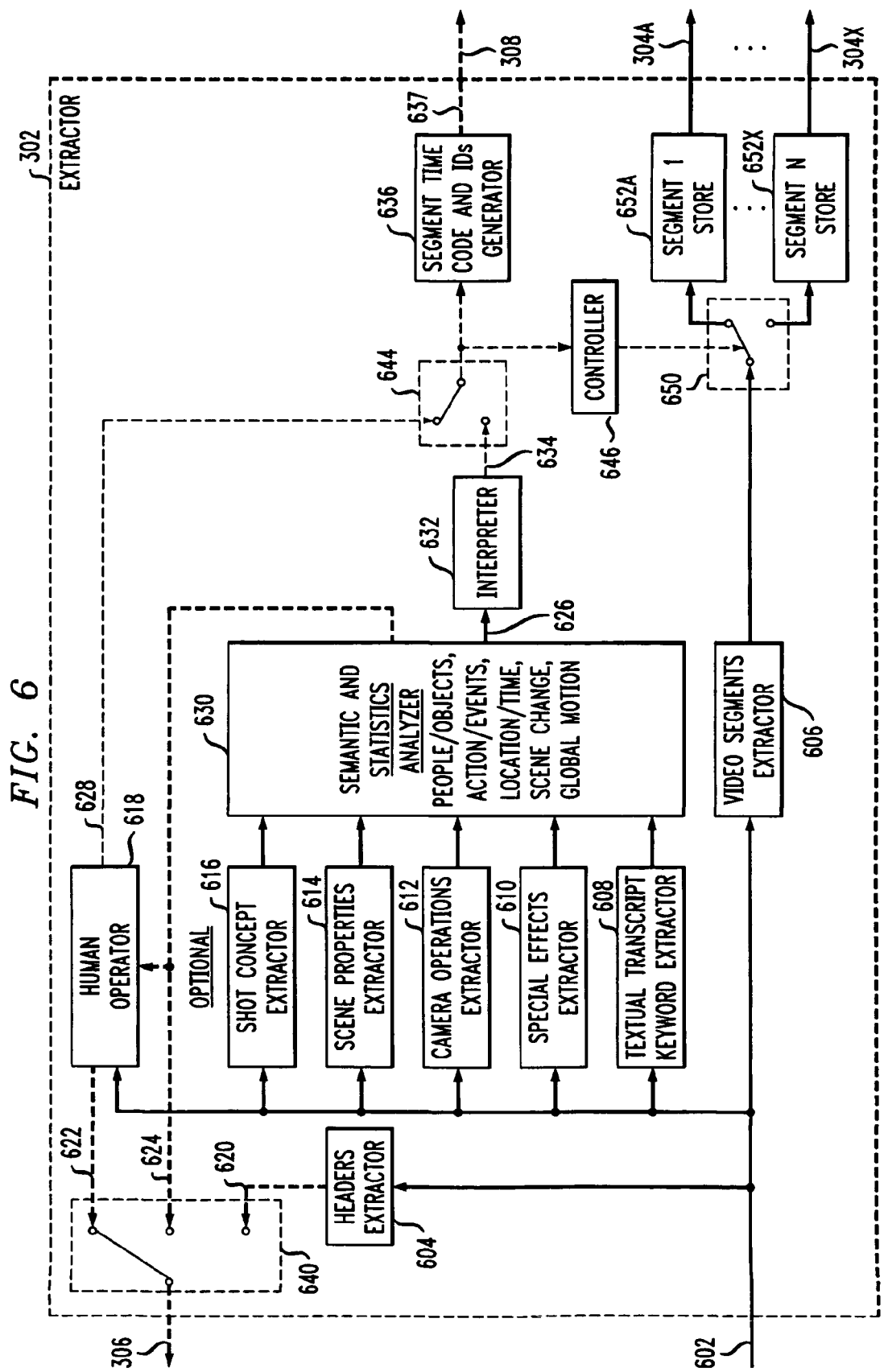
FIG. 6 is a block diagram illustrating a semantics and global scene attributes-based classifier and video segments extractor.

FIG. 6 shows details of semantics and global statistics based classifier, and video segments extractor 302 introduced in FIG. 3. Video content input on line 602 undergoes one or more of the three types of global operations. One operation involves a headers extractor 604 operable to extract headers containing meta information about the video content such as the composition of shots (including segments), use concepts, scene properties, lighting, motion, and special effects. The header extractor 604 outputs extracted headers on line 620. The headers may be available as textual data or may be encoded. The headers extractor 604 has a decoding capability for handling encoded header information.

Another operation on the video content 602 applies when the video data does not contain headers. In this case, the video content is made available to a human operator using a module ore system 618 for manual determination of segment, subsegments and ROIs. The module may have as inputs data from a number of content analysis circuits or tools that allow interactive manual analysis or semi-automatic analysis. For full manual analysis, the operator 618 reviews the video content and, using content analysis tools, classifies segments, subsegments and/or regions of interest. The output from the manual analysis is shown on lines 622 and 628. Line 628 provides data on the manual or semi-manual determination of segments and ROI boundaries. The semi-automatic analysis uses the optional tools receiving the video content. These tools comprise a textual transcript keyword extractor 608, a special effects extractor 610, a camera operations extractor 612, a scene properties extractor 614, and a shot concept extractor 616. Other tools may be added to these for extraction of other aspects of the video content. For example, shot boundary detection, keyframe extraction, shot clustering and news story segmentation tools may also be used. These tools assist or perform in indexing content for subsequent browsing or for coding and decoding. These extraction tools may be combined in various forms, as well as with other tools, as manual segment extraction modules for assisting in the manual extraction process. These tools may be in a form for automatically performing their functions. They may be modules or circuits or sin some other available format as would be known to those of skill in the art.

The output of each of these elements is connected to a semantic and statistics analyzer 630. The output of the semantic and statistical analyzer 630 provides a number of parameters describing the video content characteristics that are output on line 624 and line 626. For semi-automated classification, line 624 provides feedback to the human operator using a human operated module 618 in his or her classification. The analyzer 630 receives the extracted parameters from the options tools and provides an automatic classification of the content via an analysis of people, objects, action, location, time scene changes and/or global motion. The analyzer 630 may analyze other parameters than those discussed herein. Therefore, the present inventors do not consider this an exhaustive or complete list of video content features used to characterize segments, subsegments or regions of interest.

In a fully automated video content classification option, line 626 provides the video content classification parameters to an interpreter 632 the output 634 of which provides an alternative to human classification 618. The interpreter 632 receives the statistical and semantic analyzer information and determines segment boundaries. The interpreter 632 may be referred to as an automatic video segment determination module. Switch 644 selects its output between the human operator output 628 and the interpreter output 634 depending on the availability of a human operator, or some other parameters designed to optimize the classification process.

Regardless of whether the manual or automatic procedure is employed, the results of analysis are available for selection via a switch 640. The switch 640 operates to choose one of the three lines 620, 622, or 624 to output at line 306. The human operator 618 also outputs a signal 628 indicating when a new segment begins in the video content. The signal output from switch 644 triggers a time code and other identifiers for the new segment, and is output by segment time code and IDs generator block 636.

If a human operator 618 is providing the segmentation of content, either with or without assistance from description data from the semantics and statistics analyzer 630, the human operator 618 decides when a new segment of content begins. If no human operator 618 is involved, then the interpreter or automatic video segment determining module 632 decides the segment boundaries based on all available description data from the semantics and statistics analyzer 630. When both the human operator 618 and the statistics analyzer 630 are working together, the human operator's decision preferably overrides any new segment classification.

Signal 628 and signal 634 are input to the switch 644. Both the signals 628 and 634 enable a binary signal as a new segment indictor, changing the state from 0 to 1. The switch 644 is controlled to determine whether the segment boundary decision should be received from the human operator 618 or the automated analyzer 630 and interpreter 632. The output signal from switch 644 is input to the time code and IDs generator 636, which records the timecode (hour:minute:second:frame number) of the frame where the new segment begin. The output 637 from the generator 636 comprises an ID, which is a number tag for unique identification of the segment in the context of the overall content.

Line 602 also communicates the video content to the video segments extractor 606 that extracts video segments one at a time. The video segments extractor 606 outputs the segments and using a switch 650 operated under the control of a control circuit 646. The output of switch 644 is communicated to the control circuit 646. Using the new segments signal output from switch 644, the control circuit 646 controls switch 650 to transmit the respective segments for storage in one of a plurality of segment storage circuits $652_A$-$652_X$. The various segments of the video content are available on lines $304_A$-$304_X$.

Figure 7:
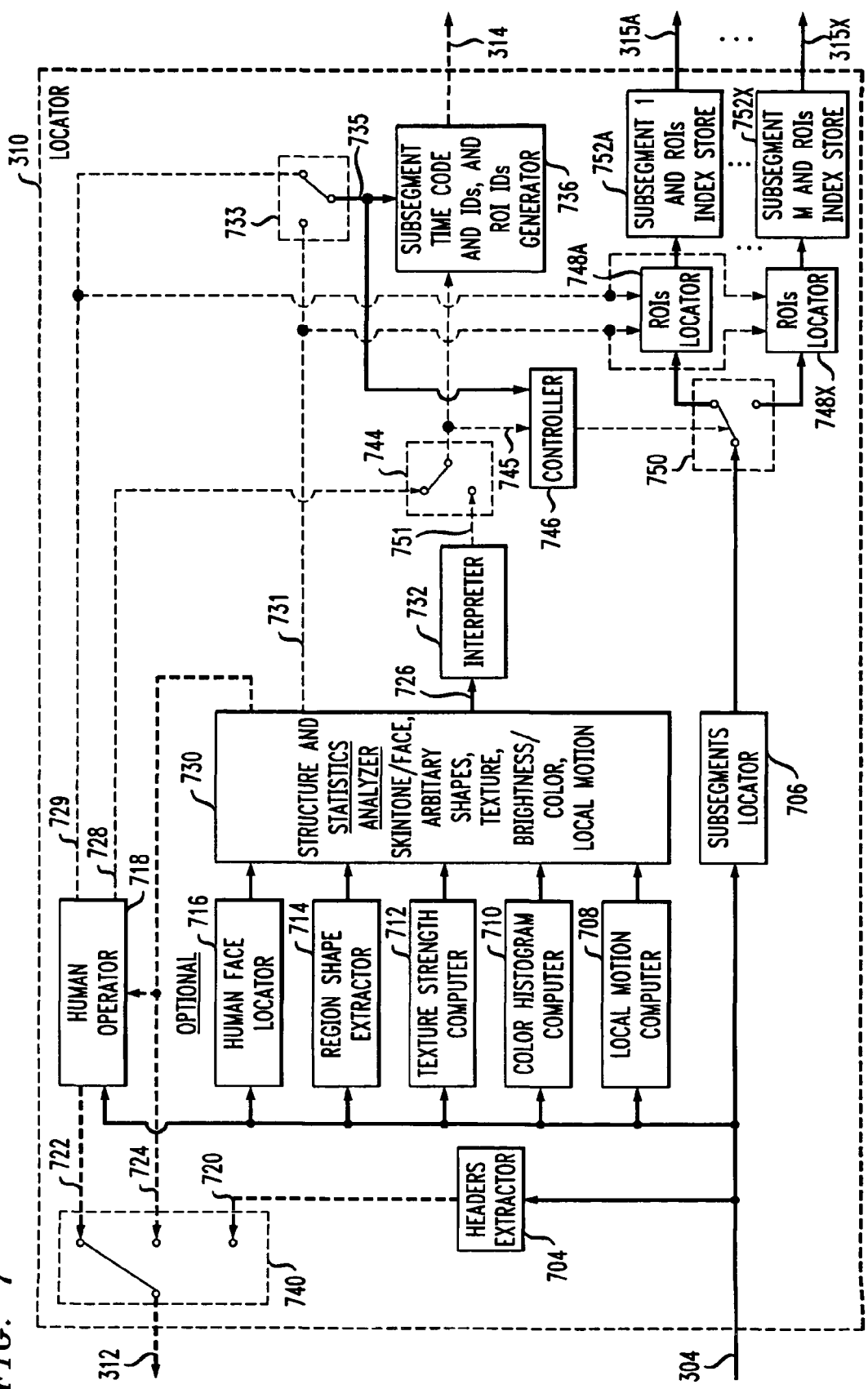
FIG. 7 is a block diagram illustrating a structure and local scene attributes based classifier, and a subsegments and ROI identifier.

FIG. 7 shows further details for the structure and local statistics based classifier, subsegments and ROI locator 310 introduced above in FIG. 3. Generally, the structure shown in FIG. 7 may be referred to as a video content locator. Video content received on line 304 undergoes one or more of three types of local operations. Video content at line 304 may have headers containing meta information about the content such as the composition of shots (including subsegments), local texture, color, motion and shape information, human faces and regions of interest. The headers extractor block 704 receives the content and outputs extracted headers on line 720. The headers may be available as textual data or may be encoded. When encoded, the extractor 704 includes the capability for decoding the header information.

If the video data does not contain the headers, the video content on line 304 is input to a manual module 718 used by a human operator who has access to a number of content analysis tools or circuits that either allow manual, interactive manual, or semiautomatic analysis. For full manual analysis, the operator using the manual module 718 reviews the video content and classifies segments and subsegments without the aid of other analyzers, circuits or tools. Line 722 illustrates output classification signals from the manual analysis from the manual module 718. Signal 728 is a binary signal indicating a new segment or subsegment and signal 729 carries control information about ROIs. The signal 729 carries frame numbers where ROI's appear and the location of ROI within the frame. The ROI are specified by descriptors such as top left location of bounding box around ROI as well as the width and height of the ROI. The output signal 729 is connected to a switch 733.

The semiautomatic analysis uses the optional tools or a plurality of characteristic circuits 708, 710, 712, 714, and 716 each receiving the video content 304. The tools comprise a local motion computer 708, a color histogram computer 710, a texture strength computer 712, a region shape extractor 714, and a human face locator 716. Other tools for locating subsegments or regions of interest may be employed as well. The present list is not meant to be exhaustive or limiting. Each of these circuits outputs a signal to a semantic and statistics analyzer 730. One output 731 of the analyzer 730 includes control information about ROIs. Output 731 connects to an input switch 733 such that the control information for ROIs may selectively be input 735 from either the manual module 718 or the analyzer 730 to the subsegment time code and IDs, and ROI IDs generator 736.

The statistics analyzer 730 receives the data regarding skintones, faces, arbitrary shapes, textures, brightness and colors and motion to perform a statistical analysis on how to classify the video segments. The output of the semantic and statistical analysis block 730 provides a number of parameters describing the video content characteristics that are output on line 724 and line 726. For semi-automated classification, line 724 provides feedback to the human operator 718 in his or her classification.

In a fully automated video content classification option, output 726 provides the video content classification parameters to an interpreter 732. The output 751 of the interpreter 732 is connected to an input of switch 744. Switch 744 selects its output between the human operator 718 and the interpreter 732 depending on the availability of a human operator, or some other parameters designed to optimize the classification process. The human operator module 718 also outputs a signal on line 728 that indicates when a new subsegment and region of interest begins in the video content. A structural and statistics analysis 730 occurs such that a number of parameters describing its characteristics can still be output on line 724. The signal output from switch 744 is used to trigger a time code of subsegment identifiers, and other region of interest identifiers. Time coded IDs, and ROI IDs are output 314 from a segment time code and IDs, and ROI IDs generator 736.

The classification output 728 from the human operator module 718 or output 751 from the interpreter 732 is a time code (hour:minute:second:frame number) related to a subsegment time code. Subsegments need IDs and labels for identification, such as for a third subsegment of a fifth segment. Such time codes may be in the form of subsegment "5C" where the subsegment IDs run from A . . . Z. In another example, a second ROI of the third subsegment may receive an ID of 5Cb following the same pattern. Any ID format that adequately identifies segments and subsegments to any degree is acceptable for the present invention. These ID numbers are converted to a binary form using ASCII representations for transmission.

Regardless of the procedure employed, the results of classification analysis are available for selection via a switch 740. The switch 740 operates to choose one of the three lines 720, 722, or 724 to output at line 312.

The video content from line 304 is also input to the subsegments locator 706 that extracts the video subsegments one at a time and outputs the subsegments to a switch 750. The subsegments locator 706 transmits subsegments and, using the switch 750 operating under the control of a control circuit 746, which switch uses the new segments signal output 745 from switch 744, applies the subsegments to a plurality of ROI locators $748_A$-$748_X$. The ROI locators $748_A$-$748_X$ also receive the control signal 729 from the human operator. The locators $748_A$-$748_X$ may also receive the control signal 731 from the statistics analyzer 730 if in an automatic mode. The locator 706 may also be a video subsegment extractor and perform functions related to the extraction process. Signal 729 or 731 carries ROI location information as discussed above. The subsegments and ROIs are stored in the subsegment and ROI index storage units $752_A$-$752_X$. The output of these storage units signifies the various subsegments and ROIs as available on lines $315_A$-$315_X$.

Figure 8:
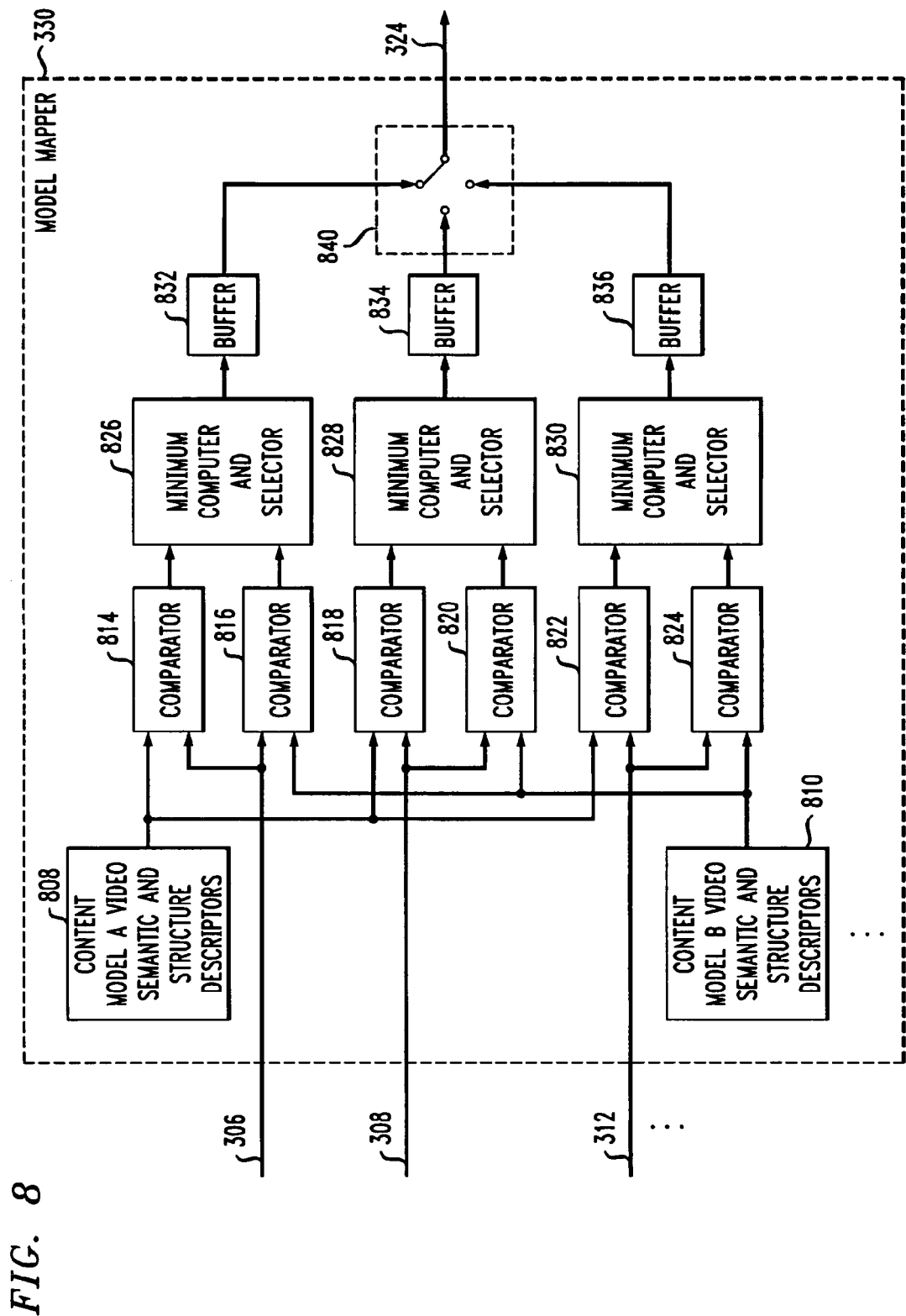
FIG. 8 shows a block diagram of a semantic and structure descriptors to nearest content model mapper.

FIG. 8 shows details of semantic and structure descriptors to nearest content model mapper 330 introduced in FIG. 3. The goal the model mapper 330 is to select the best content model for coding a video segment. Semantic and structure descriptors of a number of predetermined video content models are stored in a block 808 (for a model "A") and a block 810 (for a model "B") and so on. Blocks 808 and 810 may be referred to as content model units where each content model unit is associated with one of the plurality of models. Any number of models may be developed. As shown in FIG. 8, if more models are used, then more blocks with video content models and semantic and structural descriptors will be used in the comparisons. The descriptors for the segments and subsegments extracted from a given video content are available on lines 306, 308, and 312. A plurality of these input lines are available and only three are shown for illustration purposes. As mentioned earlier, in the discussion of FIG. 3, these descriptors are computed in blocks 302 and 310 and are output serially for all segments on corresponding lines 306, 308 and 312. The descriptors, available serially for each segment and subsegment, are combined and made available in parallel on lines 306, 308, and 312.

The descriptors on lines 306, 308, and 312 are compared against stored model descriptors output from blocks 808 (model A) and 810 (model B) in comparators 814, 816, 818, 820, 822, and 824. Each of the comparators 814, 816, 818, 820, 822, and 824 compares an input from lines 306, 308, or 312 to the output of block 808 or 810 and yields one corresponding output. The output of each pair of comparators (when there are only two content models) is further compared in one of a plurality of minimum computer and selectors 826, 828 and 830.

For example, minimum computer and selector 826 compares the output from comparator 814 with model A semantic and structure descriptors with the output from comparator 816 with model B semantic and structure descriptors and yields one output which is stored in buffer 832. Similarly, buffers 834 and 836 are used to receive outputs from computer and selectors 828 and 830 respectively.

The output 324 of buffers 832, 834 and 836 is available for selection via switch 840. Switch 840 is controlled to output the best content model that can be selected for encoding/decoding a given video segment. The best content model is generated by matching parameters extracted and/or computed for the current segment against prestored parameters for each model. For example, one model may handle slow moving scenes and may use the same parameters as that for video-telephony scenes. Another model may relate to camera motions such as zoom and pan and would include related descriptors. The range of values of the comment parameters (e.g., slow/fast motion) between models is decided with reference to the standardized dictionary of video content.

Figure 9:
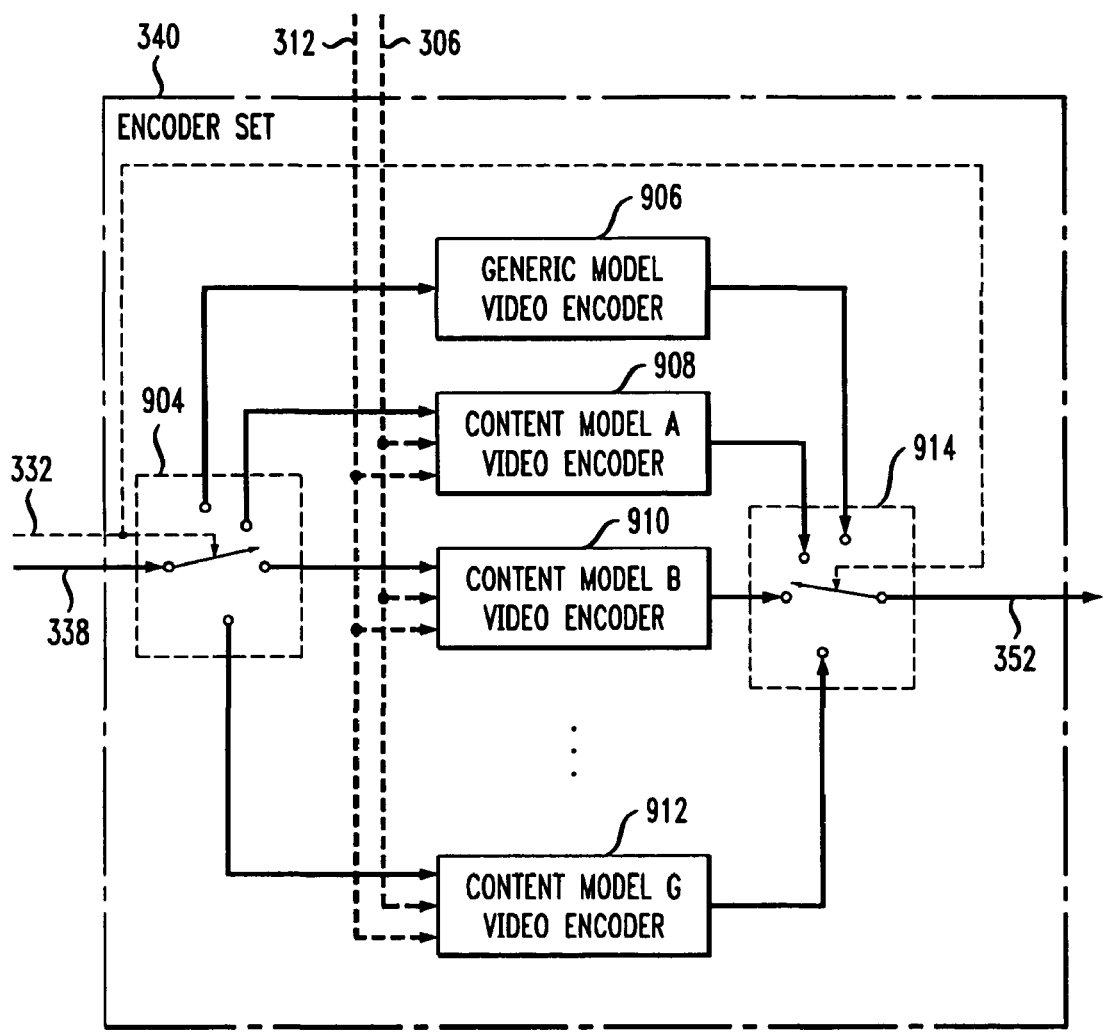
FIG. 9 is a block diagram illustrating an exemplary set of content model video segment encoders.

FIG. 9 shows details of content model video encoders 340 introduced in FIG. 3. The encoders 3409 receive a video content segment on line 338. A switch 904 controlled by signal 332 routes the input signal to various video content encoders A-G 908, 910, 912 based on the closest model to the segment. Encoders 908, 910, 912 receive signals 306 and 312 that correspondingly carry semantic and global descriptors for segments, and structure and local descriptors for subsegments. A generic model encoder 906 is a generic encoder for handling segments that could not be adequately classified or mapped to a model encoder. Switch 914 routes the coded bitstreams to an output line 352 that includes the coded bitstream resulting from the encoding operation.

The control signal 332 carries the encoder selection information and controls the operation of the switches 904 and 914. Each encoder 906, 908, 910, and 912 in addition to coded video segment data may also encode and embed a number of other control signals in the bitstream. Encoders associated with models A through G are shown, but no specific number of encoders is contemplated in the invention. An important feature is that the system and method of the present invention selects a decoder corresponding to an encoder chosen at the encoding end to maximize efficiency of content adaptive encoding and decoding.

Figure 10:
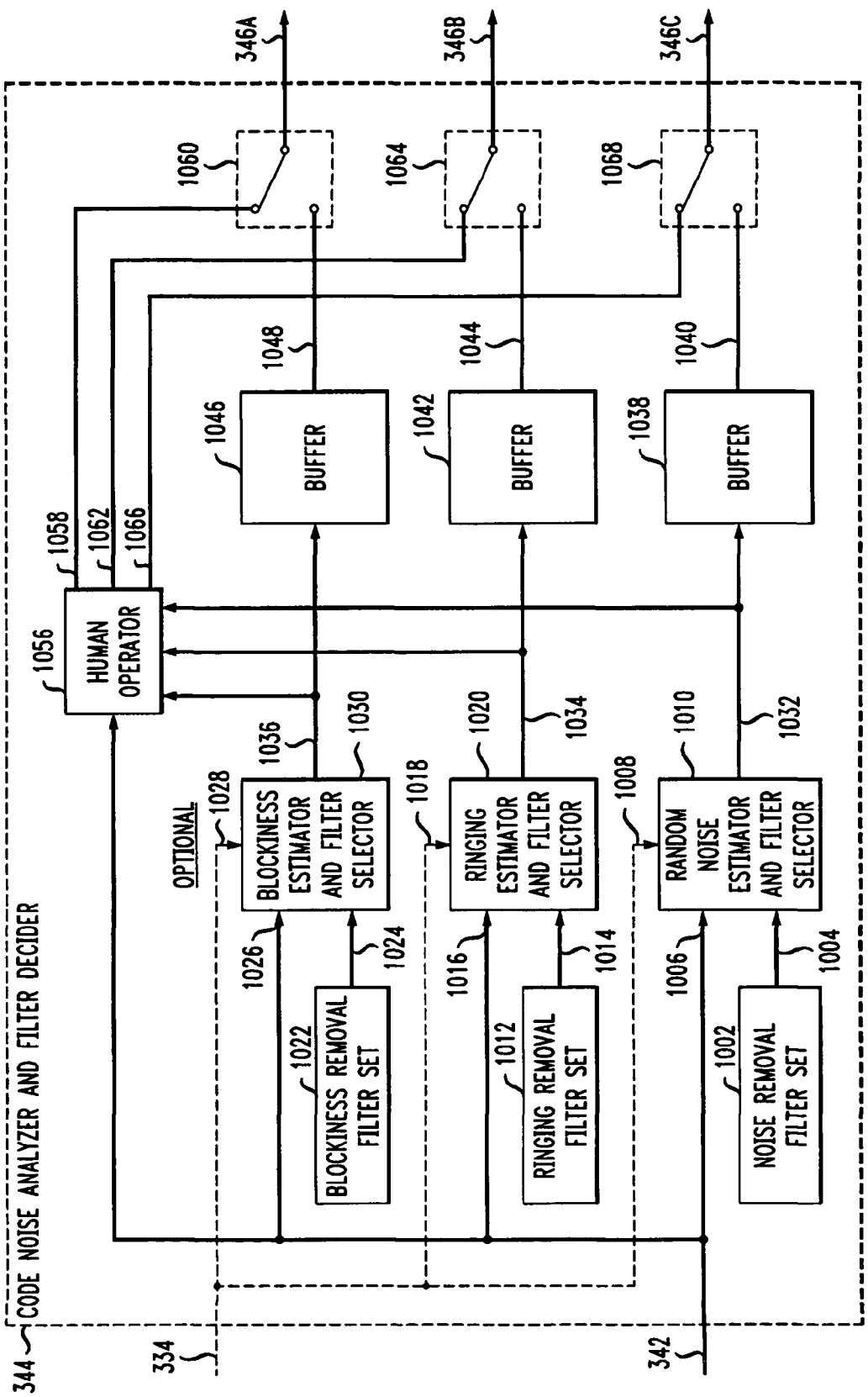
FIG. 10 is a block diagram illustrating a coding noise analyzer and filter decoder.

FIG. 10 shows coding noise analyzer and filters decider 344. Decoded video segments are input on line 342 to three estimators and filter selectors: blockiness estimator and filter selector 1030, ringing estimator and filter selector 1020 and random noise estimator and filter selector 1010. Each of estimators and filter selectors 1010, 1020 and 1030 use the content model mapping signal 332 available via line 334, and signals 1004, 1014 and 1024 identifying the corresponding available set of filters 1002, 1012 and 1022. The output 1036 of selector 1030 specifies blockiness estimated as well as the blockiness removal filter recommended from the blockiness removal filter set 1022. The output 1034 of selector 1020 specifies ringing estimated as well as the ringing removal filter recommended from ringing removal filter set 1012. The output 1032 of selector 1010 specifies random noise estimated as well as the random noise removal filter recommended from random noise removal filter set 1002. The estimator and filter selector outputs 1036, 1034 and 1032 are buffered in corresponding buffers 1046, 1042 and 1038 and are available on lines 1048, 1044 and 1040 respectively. Switches 1060, 1064 and 1068 route the buffer outputs and the output from the human operator 1056 explained below.

Line 342 provides decoded segments to human operator using a manual or semi-automatic module 1056. Human operator 1056 receives signals 1036, 1034 and 1032. The estimators and filter selectors 1030, 1020 and 1010 are optional and supplement the human operator 1056 in estimation and filter selection. It is contemplated that the human operator 1056 may also be unnecessary and that the estimation and filter selection operation may be fully automated. The human operator 1056 provides a measure of blockiness filtering on line 1058, a measure of ringing filtering on line 1062, and a measure of random noise filtering on line 1066. The output of human operator on lines 1058, 1062 and 1066 forms the second input to switches 1060, 1064, and 1068. When the human operator 1056 is present, the switches 1060, 1064, and 1068 are preferably placed in the position to divert output of 1056 to corresponding lines 346A, 346B and 346C. When the human operator is not present, the output of estimators on lines 1048, 1044 and 1040 are diverted to line outputs 346A, 346B and 346C.

FIG. 11 shows block diagram of segment description encoder 348. Semantics and global descriptors 306 and segment time code and IDs 308 are input to segment descriptors, ID, time code values to indices mapper 1102. The output of the mapper 1102 is two sets of indices 1104 and 1106, where output 1104 corresponds to semantics and global descriptors 306, and output 1106 corresponds to segment IDs and time code 308. The two sets of indices undergo mapping in a lookup table (LUT) 1110 with an address 1108, available on line 1109, to two sets of binary codes that are correspondingly output on lines 350A and lines 350B.

Similarly, structure and local descriptors 310 and subsegment/ROI time code and IDs 312 are input to subsegment/ROI descriptors, ID, time code values to indices mapper 1112. The output of mapper 1112 are two sets of indices 1114 and 1116, where output signal 1114 corresponds to structure and local descriptors 310, and output signal 1116 corresponds to subsegment/ROI IDs and time code 312. The two sets of indices undergo mapping in LUT 1120 having an address 1118, available on line 1119, to two sets of binary codes that are correspondingly output on lines 350C and lines 350D.

Preprocessing values-to-index mapper 1122 receives the preprocessing descriptor 322 that outputs an index on line 1124. The index 1124 undergoes mapping in LUT 1130 having an address 1126 available on line 1128, to binary code output on line 350E. Content model descriptor 332 is input to content model value-to-index mapper 1132 that outputs an index on line 1134. The index 1134 undergoes mapping in LUT 1140 having an address 1136 available on line 1138, to binary code that is output on line 350F. Coding noise filters descriptors 346 is input to coding noise filter values to index mapper 1142 which outputs indices on line 1144. The indices on line 1144 undergoes mapping in LUT 1150 whose address 1146 is available on line 1148, to binary code that is output on line 350G.

FIG. 12 shows block diagram of segment description decoder 362. This decoder performs the inverse function of segment description encoder 348. Two binary code sets available on lines 360A and 360B are input in binary code to indices LUT 1206 whose address 1202 is available on line 1204. LUT 1206 outputs two sets of indices, the first set representing semantics and segment descriptors on line 1208, and the second set representing segment time code and IDs on line 1209. Indices to segment descriptors, ID and time code mapper 1210 maps these indices to actual values that are output on lines 364 and 366. Similarly, two binary code sets available on lines 360C and 360D are input in binary code to indices LUT 1216 whose address 1212 is available on line 1214. LUT 1216 outputs two sets of indices, the first set representing structure and local descriptors on line 1218, and the second set representing subsegment/ROI time code and IDs on line 1219. Indices to subsegment/ROI descriptors, ID and time code mapper 1220 maps these indices to actual values that are output on lines 3648 and 370.

Binary code available on line 360E is input in binary code to index LUT 1226 whose address 1222 is available on line 1224. LUT 1226 outputs an index representing preprocessing descriptors on line 1228. Index to preprocessing values mapper 1230 maps this index to an actual value that is output on line 372. Binary code available on line 360F is input to index LUT 1236 whose address 1232 is available on line 1234. LUT 1236 outputs an index representing preprocessing descriptors on line 1238. Index to preprocessing values mapper 1240 maps this index to an actual value that is output on line 374. Binary code set available on line 360G is input to indices LUT 1246 whose address 1242 is available on line 1244. LUT 1246 outputs an index representing coding noise filters descriptors on line 1248. Index to coding noise filter values mapper 1250 maps this index to an actual value that is output on line 376.

FIG. 13 shows details of content model video decoders 378 introduced in FIG. 3. Video segment bitstreams to be decoded are available on line 377. The control signal 374 is decoded from bitstream and applied to control the operation of switch 1304 to route the appropriate bitstream to the correct decoder associated with a content model. The same control signal 374 is also used to direct the output of the appropriate decoder to output line 380 via switch 1314. A number of other control signals such as 364 and 368 carry semantic and global descriptors for segments, and structure and local descriptors for subsegments, are also input to decoders 1308, 1310 and 1312. Model A through G decoders are shown but any number of decoders may be used to correspond to the models of the encoders. A generic model decoder 1306 decodes video content segments that could not be adequately classified or mapped to a non-generic model encoder. The decoded segments resulting from decoding operation are available on outputs of the decoders and line 38 outputs a signal according to the operation of switch 1314 using the control signal 374.

FIG. 14 shows a set of coding noise removal filters 382 introduced in FIG. 3. FIG. 14 illustrates how filters are applied to decoded video to suppress the visibility of coding artifacts. Three main types of coding artifacts are addressed: blockingess, ringing and random noise smoothing. The present invention also contemplates addressing other cording artifacts in addition to those discussed herein. To remove these coding artifacts, the present invention uses blockiness removal filters 1406 and 1412, a ringing removal filter 1426 and random noise smoothing and rejection filters 1440 and 1446. The exact number of filters for blockiness removal, ringing or random noise smoothing and rejection, or even the order of application of these filters is not critical, although a preferred embodiment is shown. A number of switches 1402, 1418, 1422, 1432, 1436 and 1452 guide decoded video segments from input on line 380 to output on line 384, through different stages of filtering. Input video segment on line 380 passes through switch 1402 via lines 1404 to filter 1406, or via line 1419 to filter 1412. A third route 1416 from switch 1402 bypasses filters 1406, 1412. Depending on the filter choice 1406, 1412 or 1416 (no filter) the corresponding filtered video segment appears on line 1408, 1414 or 1416 and is routed through switch 1418, line 1420 and switch 1422 to ringing filter 1426 or no filter 1430. Switch 1432 routes line 1430 or the output 1428 of filter 1426 via line 1434 to switch 1436. The output of switch 1436 is routed to one of the three noise filters 1440, 1446 and 1450 (no filter). The output of these filters on lines 1442, 1448 and 1450 is routed through switch 1452 to line output 384.

For each type/stage of coding noise removal, no filtering is an available option. For example, in a certain case blockiness may need to be removed, but there may not be need for removal of ringing or application of noise smoothing or rejection. Filters for blockiness removal, ringing noise removal, noise smoothing and noise rejection are cascaded and applied in a selective manner on a segment and subsegment/ROI basis. Thus, which filter(s) that are used in FIG. 14 will depend on whether the global or localized filterization is desired. For example, if a global filtering is desirable, then each filter may be used to filter segments, subsegments and regions of interest. However, if only a localized filterization is desired or effective, then the switches may be controlled to only filter a specific region of interest or a specific subsegment. A variety of different control signals and filter arrangements may be employed to accomplish selective filtering of the portions of video content.

While the current invention is applicable regardless of the specifics of filters for each type of noise used, the preferred filters are a blockiness removal filter of MPEG-4 video and ringing noise removal of MPEG-4 video. A low pass filter with coefficients such as $\{1/4, 1/2, 1/4\}$ is preferred for noise smoothing. A median filter is preferred for noise rejection.

Figure 15:
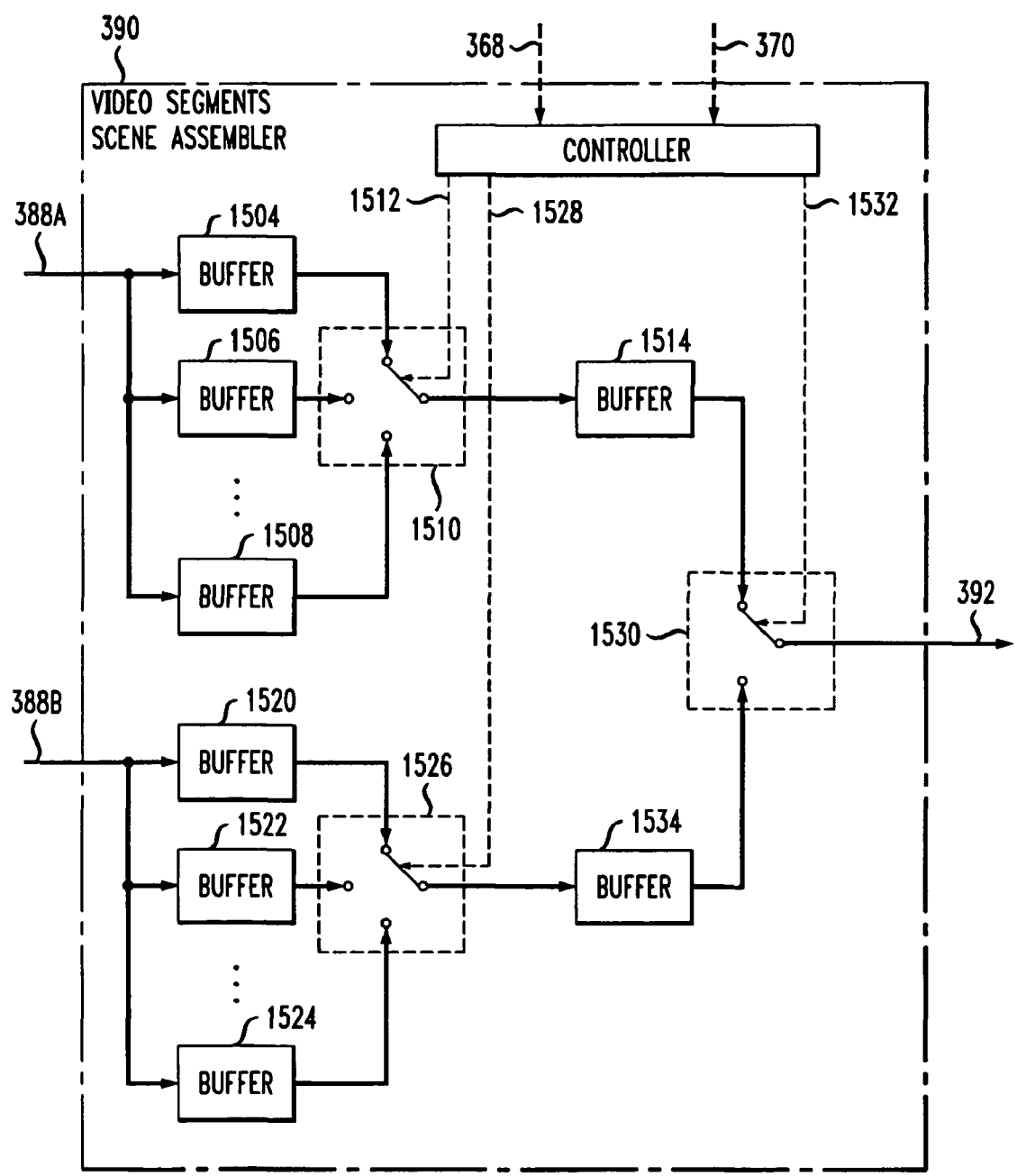
FIG. 15 is a block diagram illustrating an exemplary video segment scene assembler.

FIG. 15 illustrates a video segments scene assembler 390 introduced in FIG. 3. Although FIG. 3 illustrates a single input 388 to the assembler 390, FIG. 11 shows two inputs at line 388A and 388B to illustrate that one video segment (on line 388A) is actually stored, reordered and output while the second video segment (on line 388B) is being collected and readied to be output after the display of previous segments. Thus, a preferred embodiment uses a ping-pong operation of two identical sets of buffers. This may be best illustrated with an example.

Assume a segment input to the assembler 390 is first input on line 388A and its subsegments are stored in buffers 1504, 1506 and 1508. Only three buffers are shown but more are contemplated as part of this invention. The appropriate subsegment is output from each buffer one at a time through a switch 1510 under the control of signal 1512 to buffer 1514 where it is output to display via switch 1530 under control of signal 1532 on an output line 392. While outputting the signal from the buffer 1514 for display, the next segment is accumulating by connecting the input to assembler 390 to line 388B, and undergoing an identical process resulting in subsegments in buffers 1520, 1522 and 1524. While only three buffers are shown, more are contemplated as being part of the invention. The appropriate subsegments at the output of buffers 1520, 1522 and 1524 pass one at a time through the switch 1526 under the control of signal 1528 to buffer 1534 where they are read out to display via switch 1530 under control of signal 1532. The control signals 1512, 1528 and 1532 as output from controller 1534, Controller 1534 receives two control signals 368 and 370 decoded by segment description decoder 362.

Figure 16A:
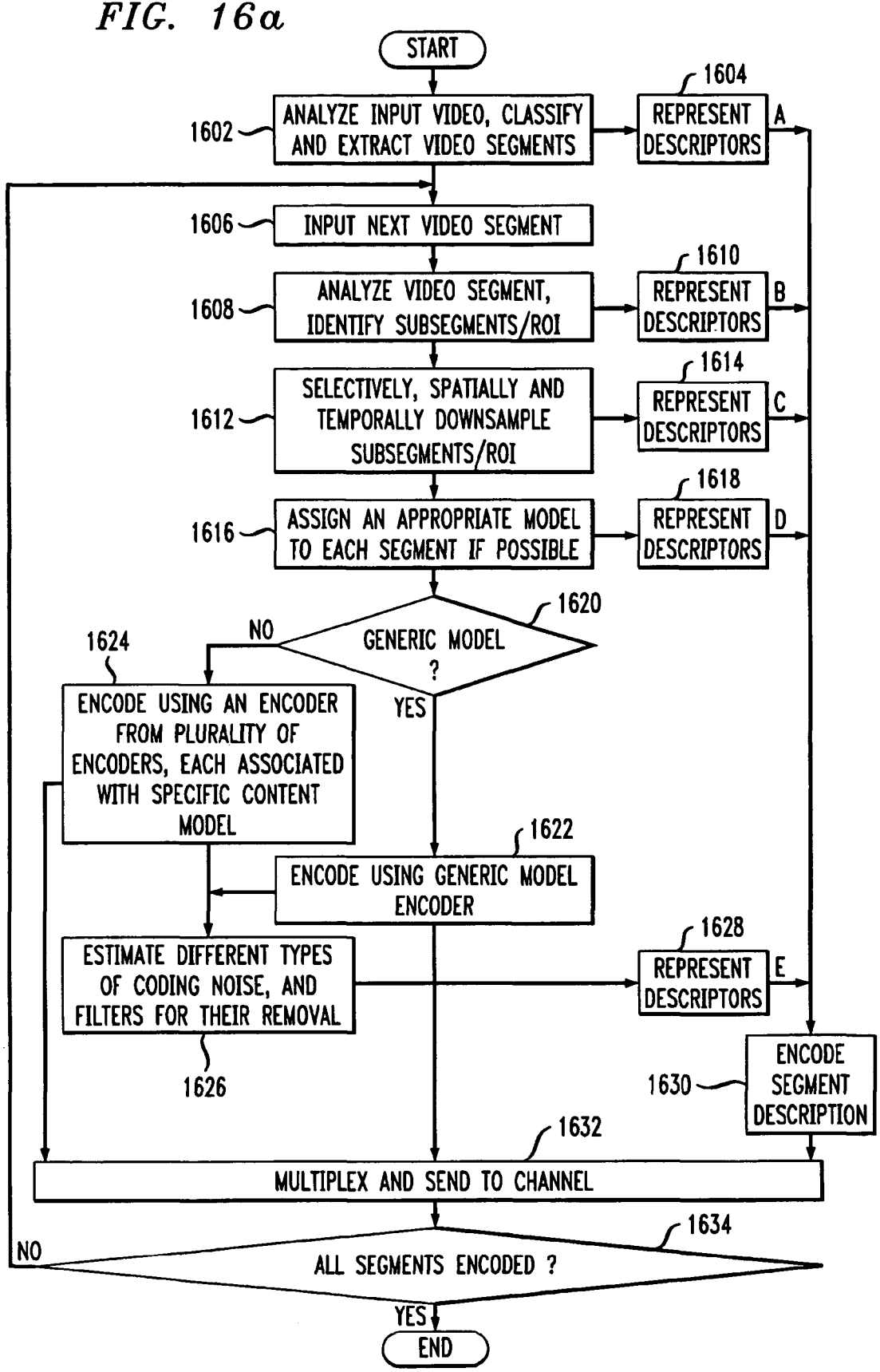
FIGS. 16a and 16b show an example of a method of encoding and decoding a bitstream according to an aspect of the present invention.
Figure 16B:
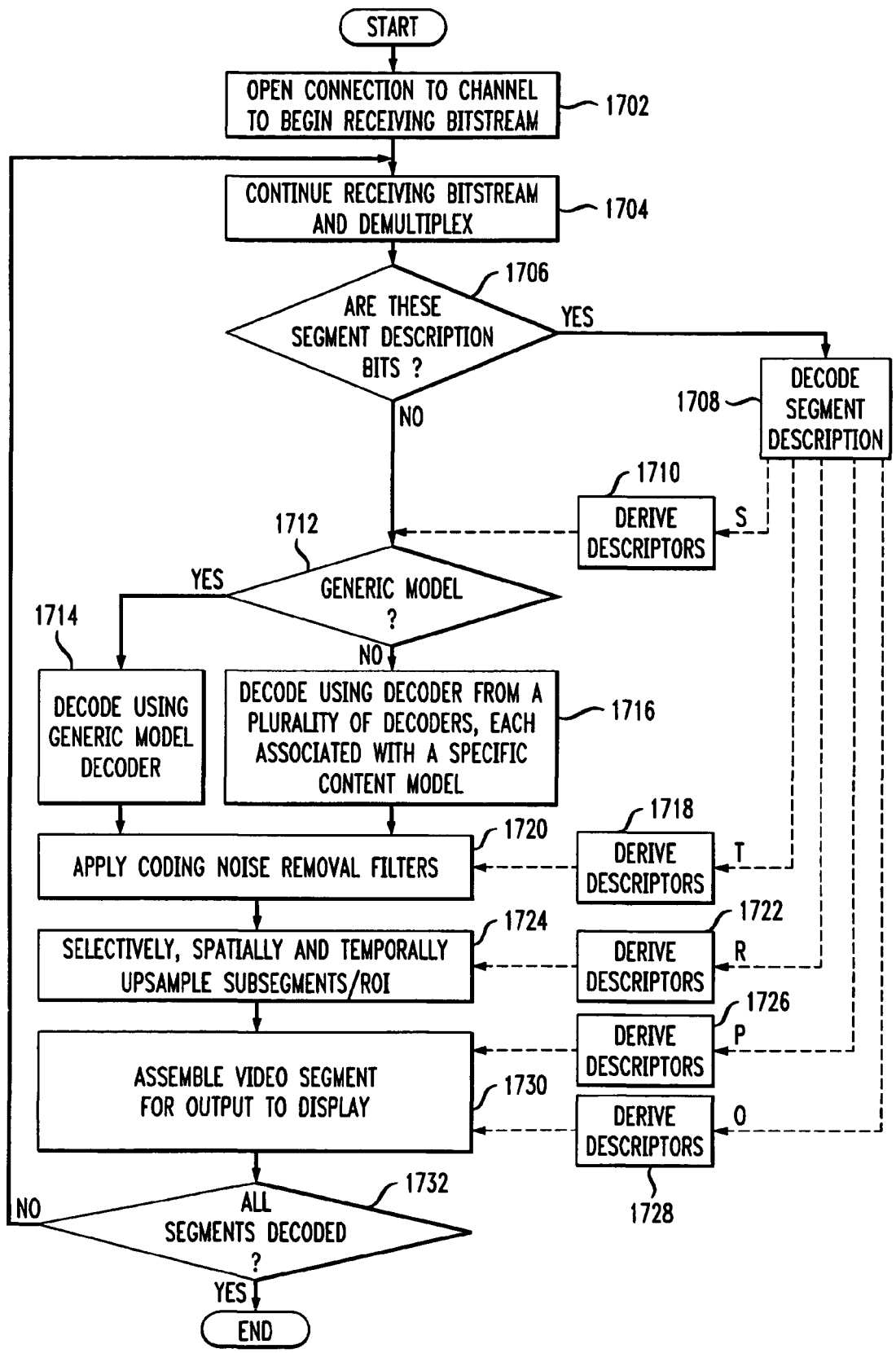

FIGS. 16a and 16b provide an example of a method for encoding and decoding a bitstream according to an aspect of the second embodiment of the invention. As shown in FIG. 16a, input video is first analyzed and then segments are extracted based on classification of portions of the video (1602). The descriptors describing the global classification of segments 1604 are forwarded as shown by connection indicator (A). Each video segment is processed in succession (1606). Each video segment is analyzed to identify subsegments and local regions of interest (ROIs) (1608). The descriptors describing the identification of subsegments and ROI (1610) are forwarded as shown by connection indicator (B). Input subsegments and ROIs are spatially and temporally downsampled (1612). The descriptors describing the subsampling (1614) are forwarded as shown by connection indicator (C).

Each segment is assigned one of the predefined models (1616). The descriptors describing the model assigned (1618) are forwarded as shown by connection indicator (D). Next, the process comprises testing whether a generic model or a specialized model is assigned to the segment being processed (1620). If a generic model is assigned, then the segment is coded with a generic model encoder (1622), the coding noise generated is estimated (1626) and the representative descriptors (1628) are sent to connection point (E). The encoded bitstream for the segment is sent to a channel (1632) for multiplexing with encoded segment descriptions (1630) which encode signals from aforementioned connection points A, B, C, D and E.

Returning to describe the other branch resulting from the test of step 1620, if step 1620 results in a determination that a specialized model is assigned to a segment, then the segment is coded with an coder for that specialized model from among a plurality of encoders (1624). The coding noise generated is estimated (1626) and the noise representative descriptors (1628) are sent to connection point (E), and the encoded bitstream for the segment is transmitted (1632) for multiplexing with encoded segment descriptions (1630) which encode signals from aforementioned connection points A, B, C, D and E. After multiplexing, the process determines whether all the segments have been encoded (1634). If no, not all segments have been encoded, the process returns to step 1606 and the process repeats for the next segment. If all the segments have been encoded (1634), the process ends and the coded stream is ready for transmission or storage.

FIG. 16b relates to a process of decoding a coded bitstream. A channel is opened to begin receiving the bitstream (1702). The channel can be a storage device or a transmission line or any other communication channel. The bitstream is received and demultiplexed (1704). The process determines whether a portion of the demultiplexed bitstream contains encoded segment descriptions or encoded segment data (1706). If the demultiplexed data corresponds to encoded segment descriptions (the answer to the query (1706) is "yes"), the segments are decoded (1708) and the outcome is a number of encoded signals recovered (that decoders have to utilize without recomputing them) and are sent to connection points P, Q, R, S, T. Signals P, Q, R, S, T correspond respectively to signals A, B, C, D, E in FIG. 16a. If the demultiplexed data corresponds to an encoded video segment (the answer to the query in step 1706 is "no"), the process determines whether the video segment is associated with a generic model or a specialized model (1712). If the model is generic, then the video segment is decoded using the general model decoder (1714). If the segment being decoded is associated with a specific decoder (the answer to the query in step 1712 is "no"), then the segment is decoded using a decoder chosen from the plurality of decoders (1716). The determination of whether a segment uses a generic model or a specialized model is made in FIG. 16*a*, and is captured via descriptors that are encoded. The very same descriptors are derived by decoding signal S in step 1710, and testing if they correspond to generic model or not in step 1712.

The output of both steps 1714 and 1716 is applied to coding noise removal filters (1720) in which first, the filter descriptors sent in FIG. 16*a* are derived by decoding signal (T) (1718) and the filter coefficients are applied in step 1720 on decoded video segments resulting in a noise suppressed signal that is input to the next step. Next, upsampling filter descriptors (also sent in FIG. 16*a*) are first derived in step 1722 from signal (R) and fed to step 1724 for selective spatial and temporal upsampling. The decoded, noise filtered, and spatially upsampled video segment is now assembled for display (1730). The assembly process uses information about how the video segment was generated (this is derived in step 1726 from signal P) and the subsegments it contains (this is derived in step 1728 from signal Q). The assembled video segment is output to a display (1730). Next, a determination is made if all video segments belonging to a video scene (e.g. a movie) have been decoded (1732). If not all segments have been decoded, the process returns to step 1704 where the bitstream continues being received with additional video segments. If all video segments are decoded, the process ends.

As discussed above, the present invention relates to a system and a method of encoding and decoding a bitstream in an improved and efficient manner. Another aspect of the invention relates to the coded bitstream itself as a "product" created according to the method disclosed herein. The bitstream according to this aspect of the invention is coded portion by portion by one of the encoders of the plurality of encoders based on a model associated with each portion of the bitstream. Thus in this aspect of the novel invention, the bitstream created according to the methods disclosed is an important aspect of the invention.

The above description provides illustrations and examples of the present invention and it not meant to be limiting in any way. For example, some specific structure is illustrated for the various components of the system such as the locator 310 and the noise removal filter 382. However, the present invention is not necessarily limited to the exact configurations shown. Similarly, the process set forth in FIGS. 16*a* and 16*b* includes a number of specific steps that are provided by way of example only. There may be other sequences of steps that will perform the same basic functions according to the present invention. Therefore, variations of these steps are contemplated as within the scope of the invention. Therefore, the scope of the present invention should be determined by the appended claims and their legal equivalents rather than by any specifics provided above.

We claim:

1. A system for removing noise in video content divided into video portions, the system comprising:
   a first filter being in parallel with a first pass-through line; and
   a second filter connected in parallel with a second pass-through line, wherein the respective inputs and outputs of each of the first filter and the second filter are controlled to either filter each video portion or not filter each video portion according to descriptors related to the video content.

2. The system of claim 1, further comprising a third filter, wherein the input and output of the third filter are controlled with the respective inputs and outputs of the first filter and the second filter to either filter each video portion or not filter each video portion according to descriptors related to the video content.

3. The system of claim 1, wherein the first filter is a blockiness removal filter.

4. The system of claim 3, wherein the second filter is a ringing removal filter.

5. The system of claim 2, wherein the first filter is a blockiness removal filter, the second filter is a ringing removal filter and the third filter is a noise smoothing filter.

6. The system of claim 2, wherein the first filter is a blockiness removal filter, the second filter is a ringing removal filter and third filter is a noise rejection filter.

7. The system of claim 1, further comprising a first plurality of filters in parallel with the first bypass line and wherein an output of the first plurality of filters and the first bypass line is connected to an input of the second filter and the second bypass line wherein for each video portion, filtering or bypassing is controlled according to descriptors related to the content of each video portion.

8. The system of claim 7, further comprising a plurality of third filters connects in parallel to a third bypass line, and wherein an output of the second filter and second bypass line is connected to an input to the third plurality of filters and third bypass line, wherein for each video portion, filtering or bypassing is controlled according to descriptors related to the content of each video portion.

9. The system of claim 7, wherein the first plurality of filters comprises blockiness removal filters.

10. The system of claim 7, wherein the second filter is a ringing removal filter.

11. The system of claim 8, wherein the third plurality of filters comprises a noise smoothing filter and a noise rejection filter.

12. A tangible computer-readable storage medium storing instructions for controlling a computing device to remove noise from video content divided into video portions, the instructions comprising the steps:
   receiving descriptors associated with each video portion; and
   filtering using or bypassing at least one filter according to the received descriptors for each video portion.

13. The computer-readable medium of claim 12, wherein noise is removed from the video portions using a first filter having a first bypass line and a second filter having a second bypass line.

14. The computer-readable medium of claim 12, wherein each video portion is decoded by either a generic decoder or a decoder chosen from a plurality of decoders wherein each decoder of the plurality of the decoders is associated with a content model.

15. The computer-readable medium of claim 13, wherein the instructions further comprise:
   filtering using or bypassing the first filter according to the decoder used to decode each video portion; and
   filtering using or bypassing the second filter according to the decoder used to decode each video portion.

16. A computer-readable medium storing instructions for controlling a computing device to removing noise from video content, the video content being divided into video segments, the instructions comprising the steps:

receiving descriptors associated with each video segment, the descriptors being related to characteristics of each video segment; and for each video segment of the video content, determining whether to filter or bypass filtering based on the receipt descriptors for the respective video segment.

17. The computer-readable medium of claim 16, wherein the step of determining whether to filter or bypass filtering occurs for a plurality of filters, each of the plurality of filters having a bypass line.

* * * * *